(12) United States Patent
Imai et al.

(10) Patent No.: US 9,348,612 B2
(45) Date of Patent: May 24, 2016

(54) STORAGE MEDIUM HAVING STORED THEREIN INFORMATION PROCESSING PROGRAM, INFORMATION PROCESSING APPARATUS, INFORMATION PROCESSING SYSTEM, AND INFORMATION PROCESSING METHOD

(75) Inventors: Daiji Imai, Kyoto (JP); Tsubasa Sakaguchi, Kyoto (JP); Shohei Mizutani, Kyoto (JP); Yumi Todo, Kai (JP)

(73) Assignees: NINTENDO CO., LTD., Kyoto (JP); HAL LABORATORY INC., Tokyo (JP)

( * ) Notice: Subject to any disclaimer, the term of this patent is extended or adjusted under 35 U.S.C. 154(b) by 1127 days.

(21) Appl. No.: 12/973,635

(22) Filed: Dec. 20, 2010

(65) Prior Publication Data

US 2012/0075351 A1 Mar. 29, 2012

(30) Foreign Application Priority Data

Sep. 24, 2010 (JP) ................................ 2010-214319

(51) Int. Cl.
*G06F 9/44* (2006.01)
*G06F 3/0485* (2013.01)

(52) U.S. Cl.
CPC ............ *G06F 9/4443* (2013.01); *G06F 3/0485* (2013.01)

(58) Field of Classification Search
USPC .......... 345/684, 685, 686, 687, 688; 715/786, 715/787, 788, 789
See application file for complete search history.

(56) References Cited

U.S. PATENT DOCUMENTS

| 2005/0198588 | A1* | 9/2005 | Lin et al. ....................... 715/784 |
| 2006/0109259 | A1 | 5/2006 | Ohta |
| 2008/0301569 | A1 | 12/2008 | Akagi |

FOREIGN PATENT DOCUMENTS

| EP | 2 112 594 | 10/2009 |
| JP | 2006-085210 | 3/2006 |
| WO | WO 2009/158208 | 12/2009 |

OTHER PUBLICATIONS

Extended European Search Report (7 pgs.) dated Mar. 16, 2012 issued in corresponding European Application No. 10015879.9-2211.

* cited by examiner

*Primary Examiner* — Kee M Tung
*Assistant Examiner* — Whitney Pointe
(74) *Attorney, Agent, or Firm* — Nixon & Vanderhye P.C.

(57) ABSTRACT

A part of a content 61 is displayed on a display screen. If a user has designated a first area, a scrolling indicator 57 that indicates the part displayed on the display screen is displayed at a first timing. If the user has designated a second area, the scrolling indicator 57 that indicates the part displayed on the display screen is displayed at a second timing.

7 Claims, 16 Drawing Sheets

STORAGE MEDIUM HAVING STORED THEREIN INFORMATION PROCESSING PROGRAM, INFORMATION PROCESSING APPARATUS, INFORMATION PROCESSING SYSTEM, AND INFORMATION PROCESSING METHOD

CROSS REFERENCE TO RELATED APPLICATION

The disclosure of Japanese Patent Application No. 2010-214319, filed on Sep. 24, 2010, is incorporated herein by reference.

BACKGROUND OF THE INVENTION

1. Field of the Invention

The present invention relates to a storage medium having stored therein an information processing program, an information processing apparatus, an information processing system, and an information processing method, and more particularly, to a storage medium having stored therein an information processing program which is executed by an information processing apparatus that performs information processing in accordance with an operation performed by a user using input means, an information processing apparatus, an information processing system, and an information processing method.

2. Description of the Background Art

Conventionally, in order to display a content larger than a display screen, a method in which a part of the content is displayed on the display screen, and another part of the content is displayed by a scrolling operation being performed, is used, for example. Moreover, at this time, a method of displaying a scrolling indicator for indicating the range and the position, in the entirety of the content, of the part displayed on the display screen, in a visually comprehensible manner, has been known. For example, Japanese Laid-Open Patent Publication No. 2006-85210 discloses that a scrolling indicator is displayed when the user has performed a scrolling operation, and that the display of the scrolling indicator disappears in a predetermined time period.

However, the invention disclosed by Japanese Laid-Open Patent Publication No. 2006-85210 cannot change a timing of displaying the scrolling indicator in accordance with an operation of the user.

SUMMARY OF THE INVENTION

Therefore, a main object of the present invention is to provide a storage medium having stored therein an information processing program, an information processing apparatus, an information processing system, and an information processing method that are capable of changing a timing of displaying a scrolling indicator in accordance with an operation of the user.

The present invention has the following features to solve the problems mentioned above.

The present invention is directed to a computer-readable storage medium having stored therein an information processing program which is executed by a computer of an information processing apparatus, which information processing apparatus displays, on a display section, a part of a content larger than an area displayed on the display section. The information processing program causes the computer to function as: designated position detection means; first display control means; and second display control means. The designated position detection means detects a designated position on the display section designated by a user. The first display control means, when the designated position detection means has determined that a first area has been designated, displays, on the display section at a first timing, an indicator that indicates a position, in the entirety of the content, of the part of the content displayed on the display section. The second display control means, when the designated position detection means has determined that a second area different from the first area has been designated, displays the indicator on the display section at a second timing different from the first timing.

This configuration makes it possible to change a timing of displaying the indicator in accordance with a designated area on the display section. Thus, the user can recognize which area the designated area is.

The information processing program may further cause the computer to function as: first processing means; and second processing means. The first processing means, when the designated position detection means has determined that the first area has been designated, executes scrolling processing of scrolling the part displayed on the display section, or processing assigned to the first area. The second processing means, when the designated position detection means has determined that the second area has been designated, executes the scrolling processing of scrolling the part displayed on the display section. In this case, the first display control means displays the indicator when a predetermined condition has been satisfied, and the second display control means immediately displays the indicator.

In this configuration, in the case where an area that allows scrolling processing or other processing to be executed is designated, the indicator is displayed when a predetermined condition is satisfied, and in the case where an area that allows only scrolling processing to be executed, the indicator is displayed immediately. Thus, the user can easily comprehend whether the user can execute only scrolling processing or the user can execute scrolling processing and the other processing. In addition, owing to the indicator which is displayed at an appropriate timing, the user can recognize the position of a part of a content displayed on the display section, in the entirety of the content.

The processing performed by the first processing means, and the predetermined condition may be as follows. That is, the first processing means scrolls the part displayed on the display section when the designated position detection means has determined that the designated position has changed while the first area continues to be designated, and executes the processing assigned to the first area when the designated position detection means has determined that, after the first area is designated, the designation has been released. The predetermined condition is that the designated position detection means determines that the designated position has changed while the first area continues to be designated or that the first area has continued to be designated for a predetermined time period or more.

In this configuration, in the case where an area that allows scrolling processing or other processing to be executed is designated, the indicator is displayed when an operation of selecting scrolling processing is performed. Thus, the user can appropriately recognize the indicator at a time when scrolling processing is needed.

The first area and the second area may be as follows. That is, the first area is an area in the content in which an image that allows a predetermined function to be executed is placed, and the second area is an area in the content in which the image is not placed.

This configuration makes it possible to change a timing of displaying the indicator in accordance with whether an area in which an image that allows a predetermined function to be executed is placed is designated or an area in which such an image is not present is designated. Thus, the user can easily recognize whether or not the designated area is an area that allows the predetermined function to be executed.

The present invention may be directed to an information processing apparatus that displays, on a display section, a part of a content larger than an area displayed on the display section. The information processing apparatus comprises: designated position detection means; first display control means; and second display control means. The designated position detection means detects a designated position on the display section designated by a user. The first display control means, when the designated position detection means has determined that a first area has been designated, displays, on the display section at a first timing, an indicator that indicates a position, in the entirety of the content, of the part of the content displayed on the display section. The second display control means, when the designated position detection means has determined that a second area different from the first area has been designated, displays the indicator on the display section at a second timing different from the first timing.

In addition, the present invention may be directed to an information processing system that displays, on a display section, a part of a content larger than an area displayed on the display section. The information processing system comprises: designated position detection means; first display control means; and second display control means. The designated position detection means detects a designated position on the display section designated by a user. The first display control means, when the designated position detection means has determined that a first area has been designated, displays, on the display section at a first timing, an indicator that indicates a position, in the entirety of the content, of the part of the content displayed on the display section. The second display control means, when the designated position detection means has determined that a second area different from the first area has been designated, displays the indicator on the display section at a second timing different from the first timing In addition, the present invention may be directed to an information processing method for displaying, on a display section, a part of a content larger than an area displayed on the display section. The information processing method executes the following processing. First, a designated position on the display section designated by a user is detected. Next, when it has been determined that a first area has been designated, an indicator that indicates a position, in the entirety of the content, of the part of the content displayed on the display section is displayed on the display section at a first timing. When it has been determined that a second area different from the first area has been designated, the indicator is displayed on the display section at a second timing different from the first timing.

The present invention can change a timing of displaying the indicator in accordance with an area on the display section designated by the user. Thus, the user can recognize which area the designated area is, and can recognize the indicator at an appropriate timing. In addition, the indicator can be displayed so as to precisely reflect the intention of the user in the operation.

These and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, with reference to the drawings, an information processing apparatus according to one embodiment of the present invention will be described. It is noted that the information processing apparatus of the present invention, and an information processing program executed by the information processing apparatus are applicable to any computer system. In the present embodiment, a case where a hand-held game apparatus 10 which is an example of the information processing apparatus executes an information processing program stored in an external memory 45 will be described as an example.

[Configuration of the Game Apparatus 10]

Figure 1:
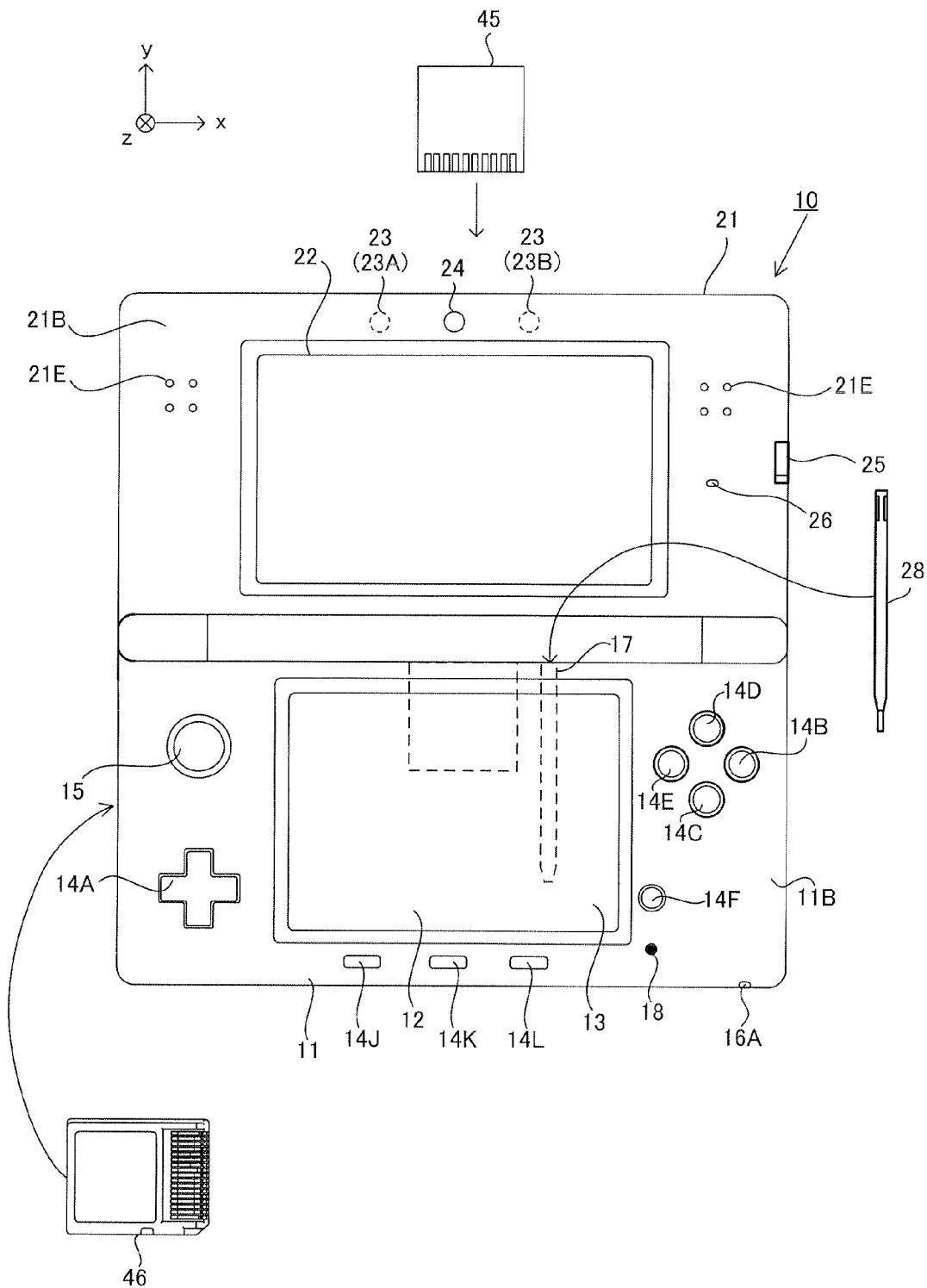
FIG. 1 is a front view showing a game apparatus 10 in an opened state.
Figure 2:
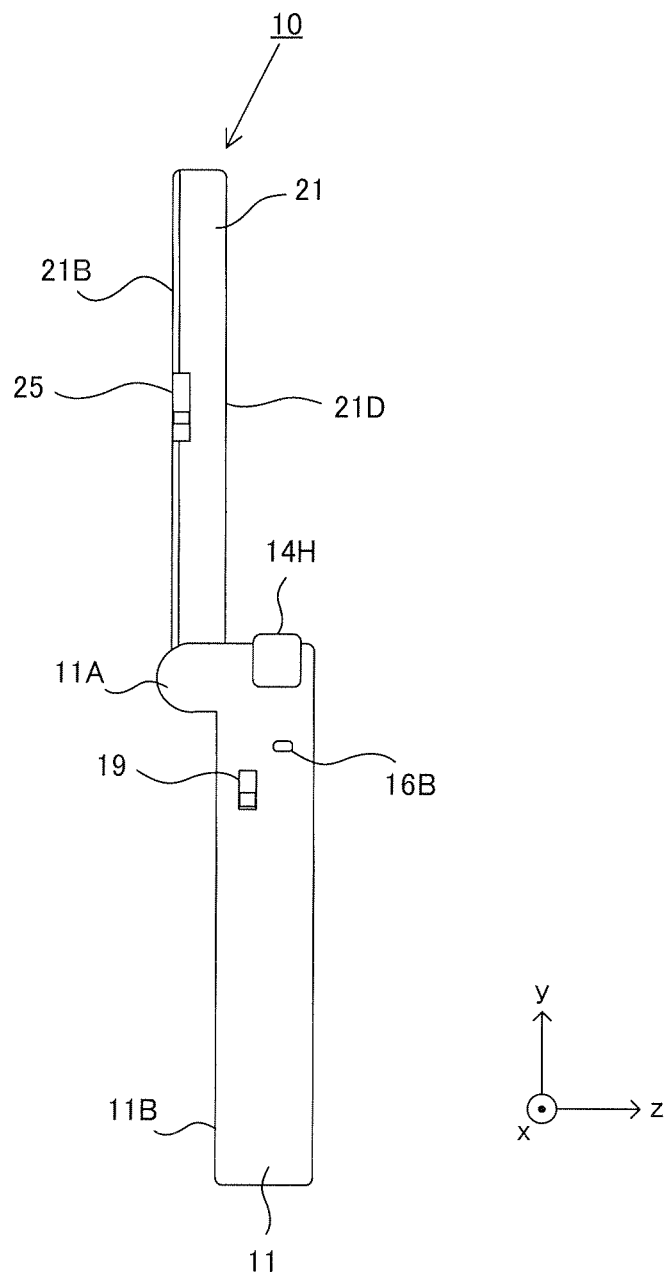
FIG. 2 is a right side view showing the game apparatus 10 in an opened state.
Figure 3:
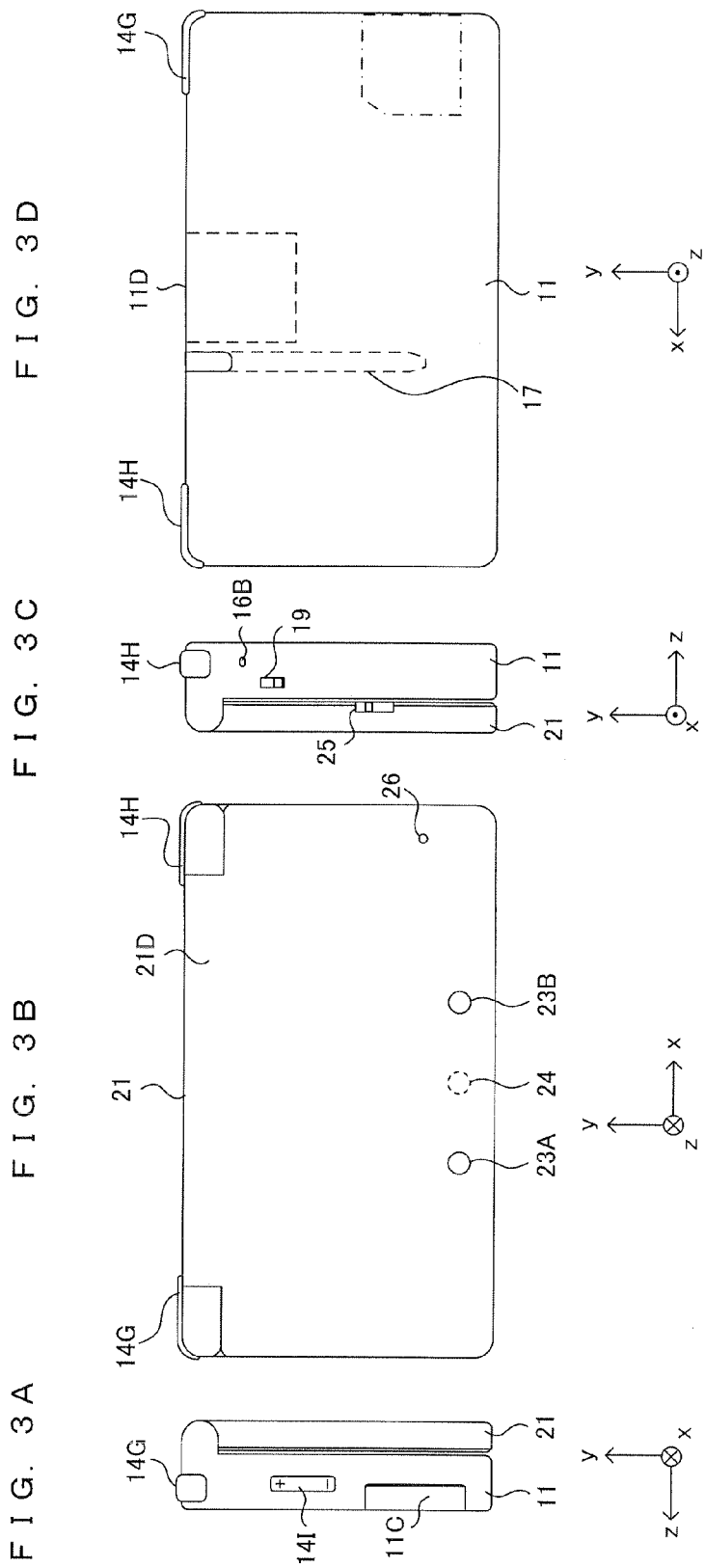
FIG. 3A is a left side view showing the game apparatus 10 in a closed state.
FIG. 3B is a front view showing the game apparatus 10 in a closed state.
FIG. 3C is a right side view showing the game apparatus 10 in a closed state.
FIG. 3D is a rear view showing the game apparatus 10 in a closed state.

FIG. 1 is a front view showing the game apparatus 10 in an opened state. FIG. 2 is a right side view showing the game apparatus 10 in the opened state. FIG. 3A is a left side view showing the game apparatus 10 in a closed state. FIG. 3B is a front view showing the game apparatus 10 in the closed state. FIG. 3C is a right side view showing the game apparatus 10 in the closed state. FIG. 3D is a rear view showing the game apparatus 10 in the closed state.

The game apparatus 10 includes an imaging section for shooting an image, and is able to display a shot image on a screen and save data of the shot image. In addition, the game apparatus 10 can execute a program which is stored in an exchangeable memory card (external memory 45), or a program which is received from a server or another game apparatus. By executing these programs, the game apparatus 10 can also display, on the screen, an image that is generated by performing computer graphics processing for an image shot by a virtual camera set in a virtual space.

The game apparatus 10 includes a lower housing 11 and an upper housing 21. The lower housing 11 and the upper housing 21 are connected to each other so as to be openable and closable. Therefore, the game apparatus 10 can be folded. The game apparatus 10 is used in an opened state as shown in FIG. 1. When the game apparatus 10 is not used, the game apparatus 10 is kept in a closed state (see FIG. 3A to FIG. 3D). In addition to the closed state and the opened state, the game apparatus 10 is capable of maintaining an angle between the lower housing 11 and the upper housing 21 at any angle ranging between the closed state and the opened state by frictional force generated at a connection portion and the like. In other words, the upper housing 21 can be stationary at any angle with respect to the lower housing 11.

[Configuration of the Lower Housing 11]

In the lower housing 11, a lower LCD (Liquid Crystal Display) 12, a touch panel 13, operation buttons 14A to 14L (FIG. 1, FIG. 3A to FIG. 3D), an analog stick 15, an LED 16A and an LED 16B, an insertion opening 17, and a microphone hole 18 are provided.

The lower LCD 12 has a display screen whose length in the long-side direction is longer than the length in the short-side direction, and is provided at the center of an inner side surface 11B of the lower housing 11. The number of pixels of the lower LCD 12 is, as one example, 256 dots×192 dots (the longitudinal linexthe vertical line), which is not limited thereto. The lower LCD 12 is a display device for displaying an image in a planar manner (not in a stereoscopically visible manner), which is different from the upper LCD 22 as described below.

It is noted that although an LCD is used as a display device in the present embodiment, any other display device such as a display device using an EL (Electro Luminescence), or the like may be used.

As shown in FIG. 1, the game apparatus 10 includes the touch panel 13 which functions as input means. The touch panel 13 is mounted on the screen of the lower LCD 12 in such a manner as to cover the screen. In the present embodiment, the touch panel 13 may be, but is not limited to, a resistive film type touch panel. A touch panel of any press type such as electrostatic capacitance type may be used. In the present embodiment, the touch panel 13 has the same resolution (detection accuracy) as that of the lower LCD 12. However, the resolution of the touch panel 13 and the resolution of the lower LCD 12 may not necessarily be the same.

The insertion opening 17 (indicated by dashed lines in FIG. 1 and FIG. 3D) is provided on the upper side surface of the lower housing 11. The insertion opening 17 is used for accommodating a touch pen 28 which is used for performing an operation on the touch panel 13. Although an input on the touch panel 13 is usually made by using the touch pen 28, a finger of a user may be used for making an input on the touch panel 13, in addition to the touch pen 28.

The operation buttons 14A to 14L are each an input device for making a predetermined input. As shown in FIG. 1, among operation buttons 14A to 14L, a cross button 14A, a button 14B, a button 14C, a button 14D, a button 14E, a power button 14F, a selection button 14J, a HOME button 14K, and a start button 14L are provided on the inner side surface 11B of the lower housing 11. The buttons 14A to 14E, the selection button 14J, the HOME button 14K, and the start button 14L are respectively assigned with functions in accordance with a program executed by the game apparatus 10, as necessary. For example, the cross button 14A is used for selection operation and the like, and the operation buttons 14B to 14E are used for, for example, determination operation and cancellation operation. The power button 14F is used for powering the game apparatus 10 on/off.

The analog stick 15 is a device for indicating a direction, and is provided to the left of the lower LCD 12 on the inner side surface 11B of the lower housing 11. The analog stick 15 and the cross button 14A are positioned so as to be operated by a thumb of the user's left hand holding the lower housing 11. The analog stick 15 has a keytop that slides in parallel to the inner side surface 11 B of the lower housing 11. The analog stick 15 serves as respective functions corresponding to programs executed by the game apparatus 10.

The microphone hole 18 is provided on the inner side surface 11B of the lower housing 11. Though will be described later, a microphone 43 (see FIG. 4) is provided, as a sound input device, inside the lower housing 11, so as to correspond to the position of the microphone hole 18. A sound inputted via the microphone hole 18 is detected by the microphone 43.

As shown in FIG. 3B and FIG. 3D, an L button 14G and an R button 14H are provided on the upper side surface of the lower housing 11. The L button 14G is positioned on the left end portion of the upper side surface of the lower housing 11 and the R button 14H is positioned on the right end portion of the upper side surface of the lower housing 11. The L button 14G and the R button 14H function as, for example, shutter buttons (photographing instruction buttons) of the imaging section. Further, as shown in FIG. 3A, a sound volume button 141 is provided on the left side surface of the lower housing 11. The sound volume button 141 is used for adjusting a sound volume of a speaker 44 (see FIG. 4) of the game apparatus 10.

As shown in FIG. 3A, a cover section 11C is provided on the left side surface of the lower housing 11 so as to be openable and closable. Inside the cover section 11C, a connector (not shown) is provided for electrically connecting the game apparatus 10 to an external data storage memory 46 (see FIG. 1). The external data storage memory 46 is detachably connected to the connector. The external data storage memory 46 is used for, for example, recording (storing) data of an image taken by the game apparatus 10. The connector and the cover section 11C may be provided on the right side surface of the lower housing 11.

As shown in FIG. 3D, an insertion opening 11D is provided on the upper side surface of the lower housing 11. An external memory 45 (see FIG. 1) that is a storage medium having an information processing program stored therein is inserted into the insertion opening 11D. A connector (not shown) for connecting the game apparatus 10 to the external memory 45 in a detachable manner is provided inside the insertion opening 11D. The external memory 45 is attached to the connecter, whereby the external memory 45 and the game apparatus 10 are electrically connected, and then the information processing program is executed. It is noted that the connector and the insertion opening 11D may be provided on another side surface (for example, the right side surface) of the lower housing 11.

As shown in FIG. 1, a first LED 16A is provided on the lower side surface of the lower housing 11. The first LED 16A notifies a user of an ON/OFF state of a power supply of the game apparatus 10. As shown in FIG. 3C, a second LED 16B is provided on the right side surface of the lower housing 11. The game apparatus 10 is configured to allow wireless communication with other devices. The second LED 16B notifies a user of an establishment state of a wireless communication of the game apparatus 10, and lights up when the wireless communication is established with another device. The game apparatus 10 has a function of connecting to a wireless LAN in a method based on, for example, IEEE802.11.b/g standard. A wireless switch 19 for enabling/disabling the function of the wireless communication is provided on the right side surface of the lower housing 11 (see FIG. 3C).

[Configuration of Upper Housing 21]

In the upper housing 21, an upper LCD (Liquid Crystal Display) 22, two outer imaging sections 23 (a outer left imaging section 23A and a outer right imaging section 23B), an inner imaging section 24, a 3D adjustment switch 25, and a 3D indicator 26 are provided.

As shown in FIG. 1, the upper LCD 22 is provided on the inner side surface (main surface) 21B of the upper housing 21. The upper LCD 22 has a display screen whose length in the lateral direction is longer than the length in the longitudinal direction, and is provided at the center of the upper housing 21. The number of pixels of the upper LCD 22 is, as one example, 640 dots×200 dots (the longitudinal line×the vertical line), which is not limited thereto. It is noted that although, in the present embodiment, the upper LCD 22 is an LCD, a display device using an EL (Electro Luminescence), or the like may be used.

The upper LCD 22 is a display device capable of displaying a stereoscopically visible image. The upper LCD 22 can display an image for a left eye and an image for a right eye by using substantially the same display area. Specifically, the upper LCD 22 may be a display device using a method in which the image for a left eye and the image for a right eye are alternately displayed in the horizontal direction in predetermined units (for example, every other line). It should be noted that the upper LCD 22 may be a display device using a method in which the image for a left eye and the image for a right eye are displayed alternately in time. Further, the upper LCD 22 is a display device capable of displaying an image which is stereoscopically visible with naked eyes. In this case, as the upper LCD 22, a lenticular lens type display device or a parallax barrier type display device is used which enables the image for a left eye and the image for a right eye, which are alternately displayed in the horizontal direction, to be separately viewed by the left eye and the right eye, respectively. In the present embodiment, the upper LCD 22 of a parallax barrier type is used. The upper LCD 22 displays, by using the image for a right eye and the image for a left eye, an image (a stereoscopic image) which is stereoscopically visible with naked eyes. That is, the upper LCD 22 allows a user to view the image for a left eye with her/his left eye, and the image for a right eye with her/his right eye by utilizing a parallax barrier, so that a stereoscopic image (a stereoscopically visible image) exerting a stereoscopic effect for a user can be displayed. Further, the upper LCD 22 may disable the parallax barrier. When the parallax barrier is disabled, an image can be displayed in a planar manner (it is possible to display a planar visible image which is different from a stereoscopically visible image as described above).

As shown in FIG. 3B, the outer imaging section 23 is provided on the outer side surface (the back surface reverse of the main surface on which the upper LCD 22 is provided) 21D of the upper housing 21. The outer imaging section 23 includes the outer left imaging section 23A and the outer right imaging section 23B. Each of the outer left imaging section 23A and the outer right imaging section 23B includes an imaging device, such as a CCD image sensor or a CMOS image sensor, having a common predetermined resolution, and a lens. The lens may have a zooming mechanism.

The imaging directions of the outer left imaging section 23A and the outer right imaging section 23B are each the same as the outward normal direction of the outer side surface 21D. In addition, the imaging direction of the outer left imaging section 23A and the imaging direction of the outer right imaging section 23B are parallel to each other. The outer left imaging section 23A and the outer right imaging section 23B can be used as a stereo camera depending on a program executed by the game apparatus 10. Further, depending on a program, when any one of the two outer imaging sections (outer left imaging section 23A and outer right imaging section 23B) is used alone, the outer imaging section 23 may be used as a non-stereo camera. Further, depending on a program, images taken by the two outer imaging sections (outer left imaging section 23A and outer right imaging section 23B) may be combined with each other or may compensate for each other, thereby enabling imaging using an extended imaging range.

As shown in FIG. 1, the outer left imaging section 23A and the outer right imaging section 23B are provided such that, when a user views the screen of the upper LCD 22 from the front thereof, the outer left imaging section 23A is positioned to the left of the outer right imaging section 23B. When the outer imaging section 23 is used as a stereo camera, the outer left imaging section 23A takes an image for a left eye, which is viewed by a left eye of a user, and the outer right imaging section 23B takes an image for a right eye, which is viewed by a right eye of the user. It is noted that the distance between the outer left imaging section 23A and the outer right imaging section 23B is set so as to be approximately the same as a distance between both eyes of a person.

The inner imaging section 24 is positioned on the inner side surface (main surface) 21B of the upper housing 21, and shoots in the direction opposite to the direction in which the outer imaging section 23 shoots. Therefore, in a state where a user views the upper LCD 22 from the front thereof, the inner imaging section 24 can take an image of a face of the user from the front thereof. The inner imaging section 24 includes an imaging device, such as a CCD image sensor and a CMOS image sensor, having a predetermined resolution, and a lens. The lens may have a zooming mechanism.

As shown in FIG. 1, FIG. 2, and FIG. 3C, a 3D adjustment switch 25 is provided at the end portions of the inner side surface and the right side surface of the upper housing 21. The 3D adjustment switch 25 is used for adjusting the stereoscopic effect of a stereoscopically visible image (stereoscopic image) which is displayed on the upper LCD 22. For example, when the slider of the 3D adjustment switch 25 is positioned at the lowermost position, the upper LCD 22 is set to the planar display mode, and a planar image is displayed on the screen of the upper LCD 22. On the other hand, when the slider is positioned at a position higher than the lowermost position, the upper LCD 22 is set to the stereoscopic display mode. In this case, a stereoscopically visible image is displayed on the screen of the upper LCD 22. When the slider is positioned at a position higher than the lowermost position, a manner in which the stereoscopic image is visible is adjusted in accordance with the position of the slider. Specifically, an amount of displacement in the horizontal direction between a position of an image for a right eye and a position of an image for a left eye is adjusted in accordance with the position of the slider.

As shown in FIG. 1, the 3D indicator 26 is positioned on the inner side surface 21B of the upper housing 21. The 3D indicator 26 indicates whether or not the upper LCD 22 is in the stereoscopic display mode. The 3D indicator 26 is implemented as a LED, and is lit up when the stereoscopic display mode of the upper LCD 22 is enabled.

In addition, a speaker hole 21E is provided on the inner side surface 21B of the upper housing 21. A sound is outputted through the speaker hole 21E from a speaker 44 (see FIG. 4) described later.

[Internal Configuration of the Game Apparatus 10]

Next, an internal configuration of the game apparatus 10 will be described with reference to FIG. 4. Here, FIG. 4 is a block diagram showing an example of an internal configuration of the game apparatus 10.

Figure 4:
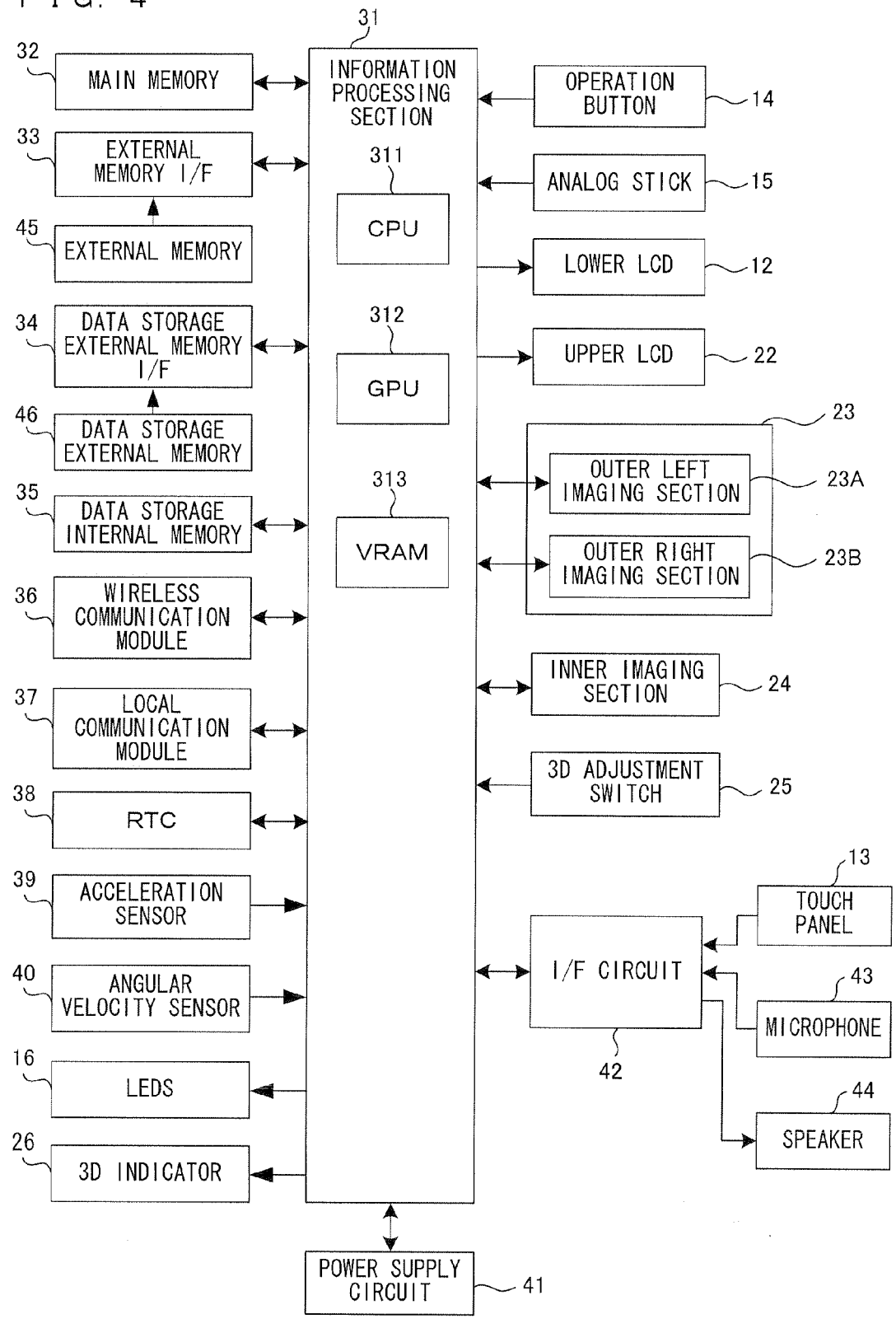
FIG. 4 is a block diagram showing an example of an internal configuration of the game apparatus 10.

As shown in FIG. 4, the game apparatus 10 includes electronic components such as an information processing section 31, a main memory 32, an external memory interface (external memory I/F) 33, an external data storage memory I/F 34, an internal data storage memory 35, a wireless communication module 36, a local communication module 37, a real-time clock (RTC) 38, an acceleration sensor 39, an angular velocity sensor 40, a power supply circuit 41, an interface circuit (I/F circuit) 42, and the like. These electronic components are mounted on an electronic circuit substrate, and accommodated in the lower housing 11 (or the upper housing 21).

The information processing section 31 is information processing means which includes a CPU (Central Processing Unit) 311 for executing a predetermined program, a GPU (Graphics Processing Unit) 312 for performing image processing, and the like. In the present embodiment, an information processing program is stored in a memory (for example, the external memory 45 connected to the external memory I/F 33 or the internal data storage memory 35) inside the game apparatus 10. The CPU 311 executes information processing such as switching a part of a content displayed on a display screen, by executing the information processing program. It is noted that the program executed by the CPU 311 may be obtained from another device through communication with the other device.

The information processing section 31 further includes a VRAM (Video RAM) 313. The GPU 312 renders an image in the VRAM 313 in accordance with an instruction from the CPU 311. The GPU 312 outputs the image rendered in the VRAM 313, to the upper LCD 22 and/or the lower LCD 12, and the image is displayed on the upper. LCD 22 and/or the lower LCD 12.

To the information processing section 31, the main memory 32, the external memory I/F 33, the external data storage memory I/F 34, and the internal data storage memory 35 are connected. The external memory I/F 33 is an interface for detachably connecting to the external memory 45. The external data storage memory I/F 34 is an interface for detachably connecting to the external data storage memory 46.

The main memory 32 is volatile storage means used as a work area and a buffer area for the CPU 311. That is, the main memory 32 temporarily stores various types of data used for the image processing and the game processing, and temporarily stores a program obtained from the outside (the external memory 45, another device, or the like), for example. In the present embodiment, for example, a PSRAM (Pseudo-SRAM) is used as the main memory 32.

The external memory 45 is nonvolatile storage means for storing a program executed by the information processing section 31. The external memory 45 is implemented as, for example, a read-only semiconductor memory. When the external memory 45 is connected to the external memory I/F 33, the information processing section 31 can load a program stored in the external memory 45. A predetermined process is performed by the program loaded by the information processing section 31 being executed.

The external data storage memory 46 is implemented as a non-volatile readable and writable memory (for example, a NAND flash memory), and is used for storing predetermined data. For example, images taken by the outer imaging section 23 and/or images taken by another device are stored in the external data storage memory 46. When the external data storage memory 46 is connected to the external data storage memory I/F 34, the information processing section 31 loads an image stored in the external data storage memory 46, and the image can be displayed on the upper LCD 22 and/or the lower LCD 12.

The internal data storage memory 35 is implemented as a non-volatile readable and writable memory (for example, a NAND flash memory), and is used for storing predetermined data. For example, data and/or programs downloaded through the wireless communication module 36 by wireless communication is stored in the internal data storage memory 35.

The wireless communication module 36 has a function of connecting to a wireless LAN by using a method based on, for example, IEEE 802.11.b/g standard. The local communication module 37 has a function of performing wireless communication with the same type of game apparatus in a predetermined communication method (for example, infrared communication). The information processing section 31 can perform data transmission to and data reception from another device via the Internet by using the wireless communication module 36, and can perform data transmission to and data reception from the same type of another game apparatus by using the local communication module 37.

The acceleration sensor 39 detects magnitudes of accelerations (linear accelerations) in the directions of the straight lines along the three axial directions (xyz axial directions, in the present embodiment), respectively. The acceleration sensor 39 is provided inside the lower housing 11, for example. In the acceleration sensor 39, as shown in FIG. 1, the long side direction of the lower housing 11 is defined as x axial direction, the short side direction of the lower housing 11 is defined as y axial direction, and the direction orthogonal to the inner side surface 11B (main surface) of the lower housing 11 is defined as z axial direction, thereby detecting magnitudes of the linear accelerations generated in the respective axial directions of the game apparatus 10, respectively. The acceleration sensor 39 is, for example, an electrostatic capacitance type acceleration sensor. However, another type of acceleration sensor may be used. The acceleration sensor 39 may be an acceleration sensor for detecting a magnitude of an acceleration for one axial direction or two-axial directions. The information processing section 31 receives data (acceleration data) representing accelerations detected by the acceleration sensor 39, and calculates an orientation and a motion of the game apparatus 10.

The angular velocity sensor 40 detects angular velocities generated around the three axes (xyz axes in the present embodiment), respectively, of the game apparatus 10, and outputs data representing the detected angular velocities (angular velocity data) to the information processing section 31. The angular velocity sensor 40 is provided in the lower housing 11, for example. The information processing section 31 receives the angular velocity data outputted by the angular velocity sensor 40 and calculates an orientation and a motion of the game apparatus 10.

The RTC 38 and the power supply circuit 41 are connected to the information processing section 31. The RTC 38 counts time, and outputs the time to the information processing section 31. The information processing section 31 calculates a current time (date) based on the time counted by the RTC 38. The power supply circuit 41 controls power from the power supply (the rechargeable battery accommodated in the lower housing 11) of the game apparatus 10, and supplies power to each component of the game apparatus 10.

The microphone 43, the speaker 44, and the touch panel 13 are connected to the I/F circuit 42. Specifically, the speaker 44 is connected to the I/F circuit 42 through an amplifier which is not shown. The microphone 43 detects a voice from a user, and outputs a sound signal to the I/F circuit 42. The amplifier amplifies a sound signal outputted from the I/F circuit 42, and a sound is outputted from the speaker 44. The I/F circuit 42 includes a sound control circuit for controlling the microphone 43 and the speaker 44 (amplifier), and a touch panel control circuit for controlling the touch panel 13. The sound control circuit performs A/D conversion and D/A conversion on the sound signal, and converts the sound signal to a predetermined form of sound data, for example. The touch panel control circuit generates a predetermined form of touch position data based on a signal outputted from the touch panel 13, and outputs the touch position data to the information processing section 31. The touch position data represents coordinates of a position, on an input surface of the touch panel 13, on which an input is made (touch position). The touch panel control circuit reads a signal outputted from the touch panel 13, and generates the touch position data every predetermined time. The information processing section 31 obtains the touch position data, to recognize a touch position on which an input is made on the touch panel 13.

The operation button 14 includes the operation buttons 14A to 14L described above, and is connected to the information processing section 31. Operation data representing an input state of each of the operation buttons 14A to 14I is outputted from the operation button 14 to the information processing section 31, and the input state indicates whether or not each of the operation buttons 14A to 14I has been pressed. The information processing section 31 obtains the operation data from the operation button 14 to perform a process in accordance with the input on the operation button 14.

A user selects the imaging section to be used by performing a predetermined operation using the touch panel 13 and the operation buttons 14. In accordance with a result of the selection, the information processing section 31 instructs one of the outer imaging section 32 or the inner imaging section 24 to take an image. Whereas, the outer imaging section 23 and the inner imaging section 24 each take an image in accordance with an instruction from the information processing section 31, and output data of the taken image to the information processing section 31.

The lower LCD 12 and the upper LCD 22 each display an image in accordance with an instruction from the information processing section 31 (the GPU 312). For example, the information processing section 31 displays, on the upper LCD 22, a stereoscopic image (stereoscopically visible image) using an image for a right eye and an image for a left eye which are taken by the outer imaging section 23. In addition, the information processing section 31 displays, on the lower LCD 12, on a content selection screen including various images (icons) for starting predetermined programs. The content selection screen will be described later in detail.

The 3D adjustment switch 25 outputs, to the information processing section 31, an electrical signal in accordance with the position of the slider. Whereas, the information processing section 31 (CPU 311) sets a display mode of the upper LCD 22, based on an electric signal from the 3D adjustment switch 25. The information processing section 31 controls whether or not the 3D indicator 26 is to be lit up. For example, the information processing section 31 lights up the 3D indicator 26 when the upper LCD 22 is in the stereoscopic display mode.

It is noted that the above-described configuration of hardware is merely an example, the configuration of the game apparatus 10 may be changed as appropriate.

[Outline of Screen Display of Game Apparatus 10]

In the game apparatus 10, the CPU 311 of the information processing section 31 executes an information processing program loaded onto the main memory 32 from the external memory 45. Hereinafter, with reference to FIG. 5 to FIG. 17, an outline of operation of the game apparatus 10 based on an information processing program will be described.

Figure 5:
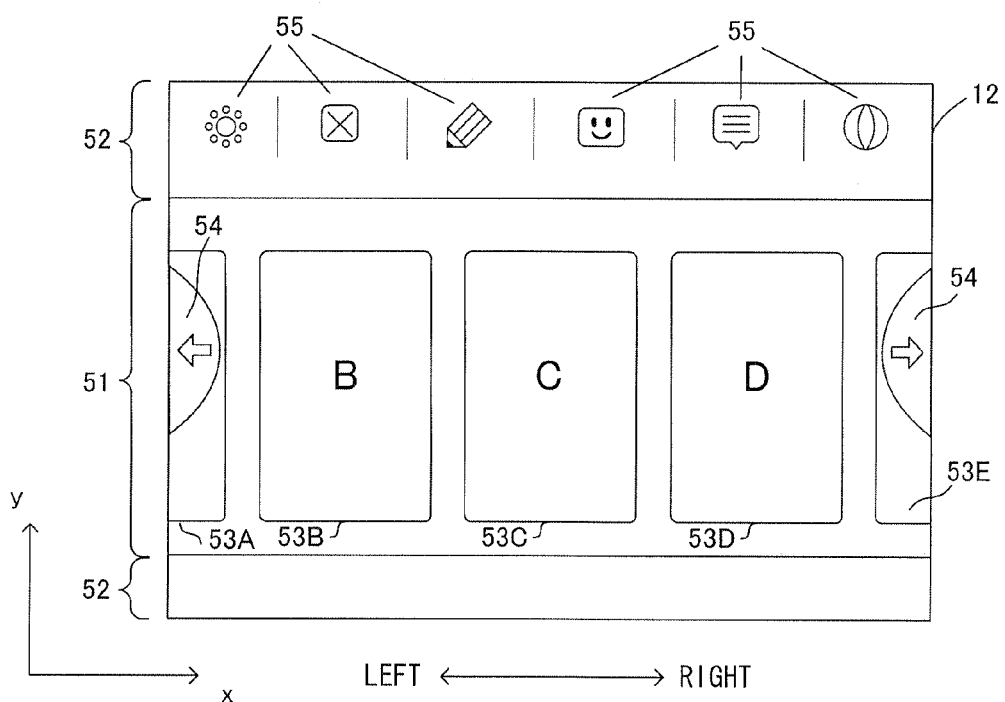
FIG. 5 is a diagram showing an example of an image displayed on a screen of a lower LCD 12.

FIG. 5 is a screen view of the lower LCD 12 showing an example of a content selection screen. The content selection screen shown in FIG. 5 includes a content display area 51 (an example of an area displayed by a display section of the present invention), and a non-content display area 52 that are present on upper and lower portions of the content display area 51. A plurality of in-content buttons 53 (in-content buttons 53A to 53E) that can be selected, and screen shifting buttons 54 are displayed in the content display area 51. That is, the content display area 51 includes an area in which the plurality of in-content buttons 53 are placed, an area in which the screen shifting buttons 54 are placed, and a button-not-placed area in which any of the buttons are not placed. In addition, the content display area 51 is an area for which a scrolling operation can be performed. A plurality of out-of-content buttons 55 that can be selected is displayed in the non-content display area 52.

The in-content buttons 53 and the out-of-content buttons 55 are button images that are respectively associated with programs to be executed by the CPU 311. The user can cause the CPU 311 to execute a desired program, by freely selecting one button from among the plurality of in-content buttons 53 and the plurality of out-of-content buttons 55 displayed on the screen of the lower LCD 12. The free selection of the buttons are realized by touching the touch panel 13 with the touch pen 28, or operating the operation buttons 14. It is noted that hereinafter, an operation of touching the touch panel 13 with the touch pen 28 is denoted by the term "touch on", and an operation of taking the touch pen 28 off the touch panel 13 is denoted by the term "touch off". In addition, a position on the touch panel 13 that the touch pen 28 has touched on is referred to as a touched-on position, and a position on the touch panel 13 that the touch pen 28 last touched on before the touch pen has touched off the touch panel 13 is referred to as a touched-off position.

The screen shifting buttons 54 are displayed in a right-end portion and left-end portion of the content display area 51. The screen shifting buttons 54 are used for switching a screen (a part of a content 61 described later) displayed in the content display area 51. The switching of a display screen performed by using the screen shifting buttons 54 will be described later in detail.

Figure 6:
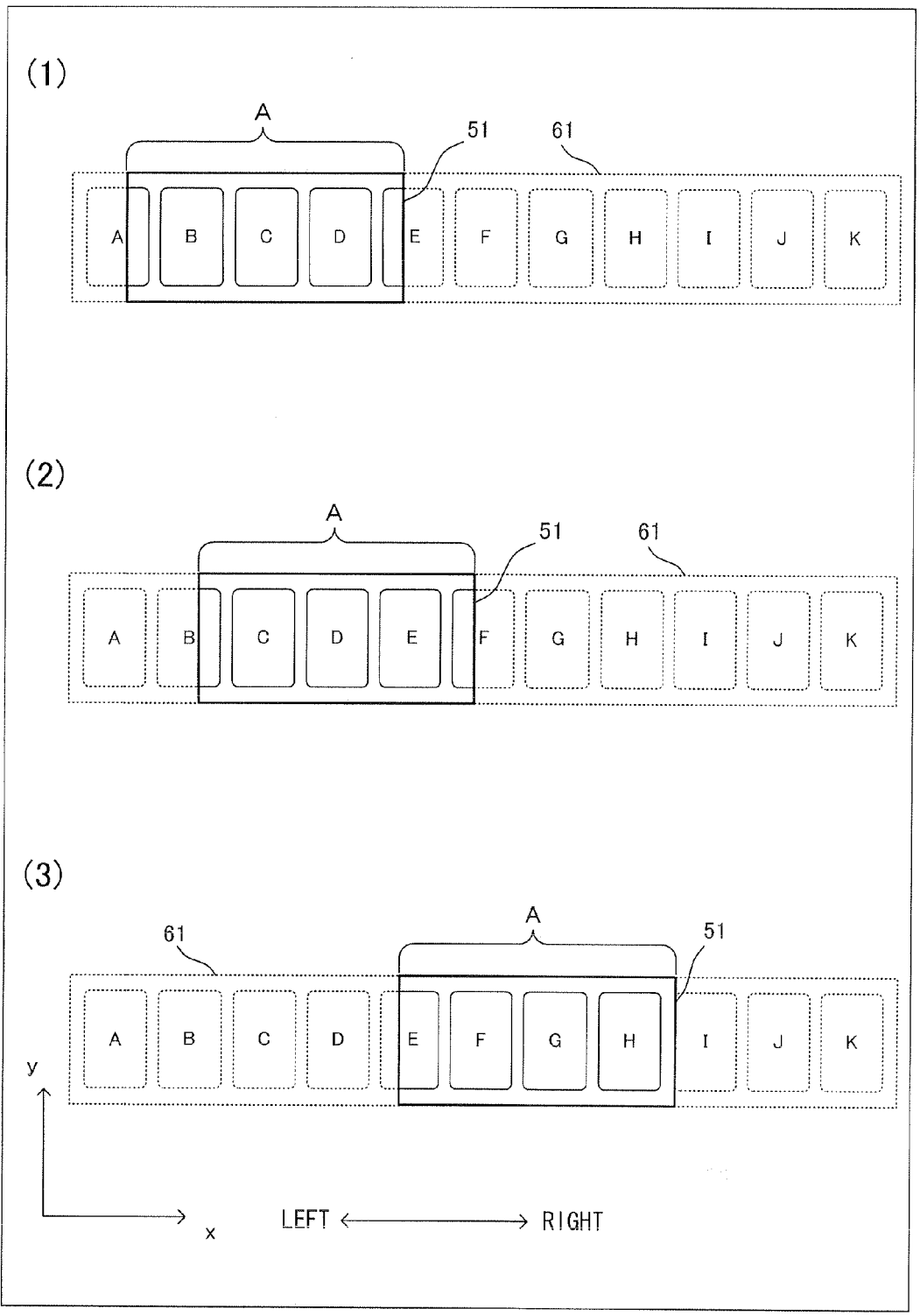
FIG. 6 is a diagram showing an example of a relation between a content 61 and a content display area 51.

FIG. 6 is a diagram showing a relation between the content 61 and the content display area 51. The content 61 shown in FIG. 6 is a virtual area including the in-content buttons 53 to be displayed in the content display area 51. On the other hand, the content display area 51 is an area in which the in-content buttons 53 are actually displayed. The size of the content 61 is larger than the size of the content display area 51. Therefore, only an area A corresponding to a part of the content 61 shown in FIG. 6 is displayed in the content display area The user can switch a part (area A) of the content 61 displayed in the content display area 51, by touching on the screen shifting button 54. Specifically, if the screen shifting button 54 displayed in the right-end portion of the content display area 51 is touched on, the area A is shifted rightward relative to the content 61 (the content 61 is shifted leftward relative to the area A), as shown in FIG. 6. Thus, a screen (a part of the content 61) displayed in the content display area 51 is shifted leftward, whereby the display screen is switched.

It is noted that various types of setting may be applied to the way in which the area A displayed in the content display area 51 is switched by the user touching on the screen shifting button 54. For example, by touching on the screen shifting button 54 once, the area A displayed in the content display area 51 may be switched such that the area A is shifted rightward (or leftward) by the length of the area A. Alternatively, the amount of shifting of the area A may be changed in accordance with the time from touching on to touching off.

Thus, by touching on the screen shifting button 54, the user can switch a part (area A) of the content 61 displayed in the content display area 51 to another part of the content 61. In addition, in switching of the area A, the amount of shifting when the area A is shifted to another part of the content 61 can be changed depending on setting, as described above, and the area A can be discontinuously shifted to another part of the content 61. That is, for example, the area A shown in FIG. 6(1) can be switched such that the area A is shifted rightward by the length of one in-content button 53, as shown in FIG. 6(2), or the area A can be switched such that the area A is shifted rightward by the length of the area A, as shown in FIG. 6(3). Thus, a screen (a part of the content 61) displayed in the content display area 51 can discontinuously and instantly (or with a certain length of time) be switched to another screen (another part of the content 61) in a jumping manner, without performing processing of continuous movement (switching) such as scrolling processing. It is noted that the above described discontinuous (instant or jumping) switching of a screen displayed in the content display area 51 to another screen is referred to as display switching, or screen shifting of the content display area 51.

Hereinafter, with reference to FIG. 7 to FIG. 17, the above screen shifting of the content display area 51, and display of a scrolling indicator 57 described later will be described.

Figure 7:
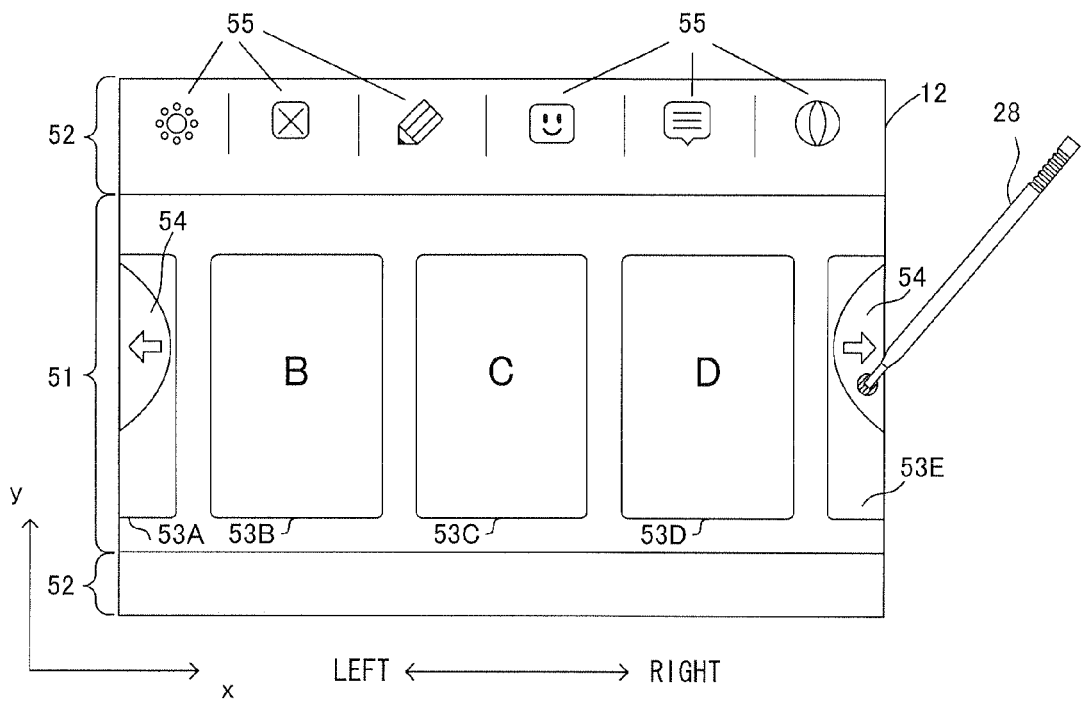
FIG. 7 is a diagram showing an example of an image displayed on the screen of a lower LCD 12.
Figure 8:
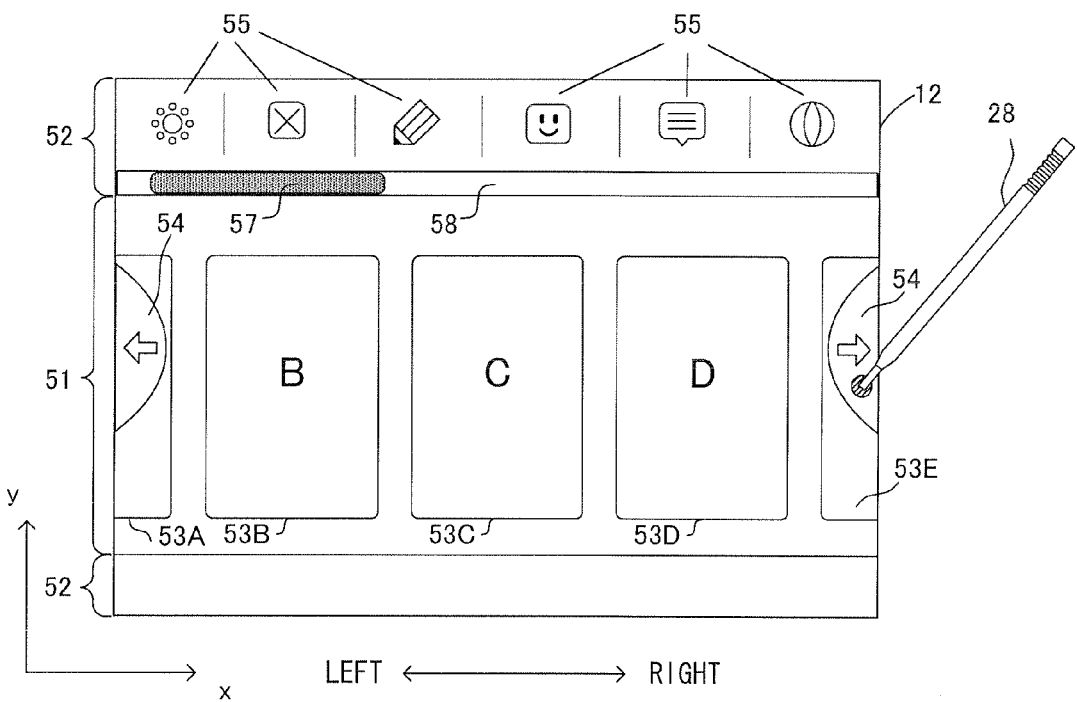
FIG. 8 is a diagram showing an example of an image displayed on the screen of the lower LCD 12.
Figure 9:
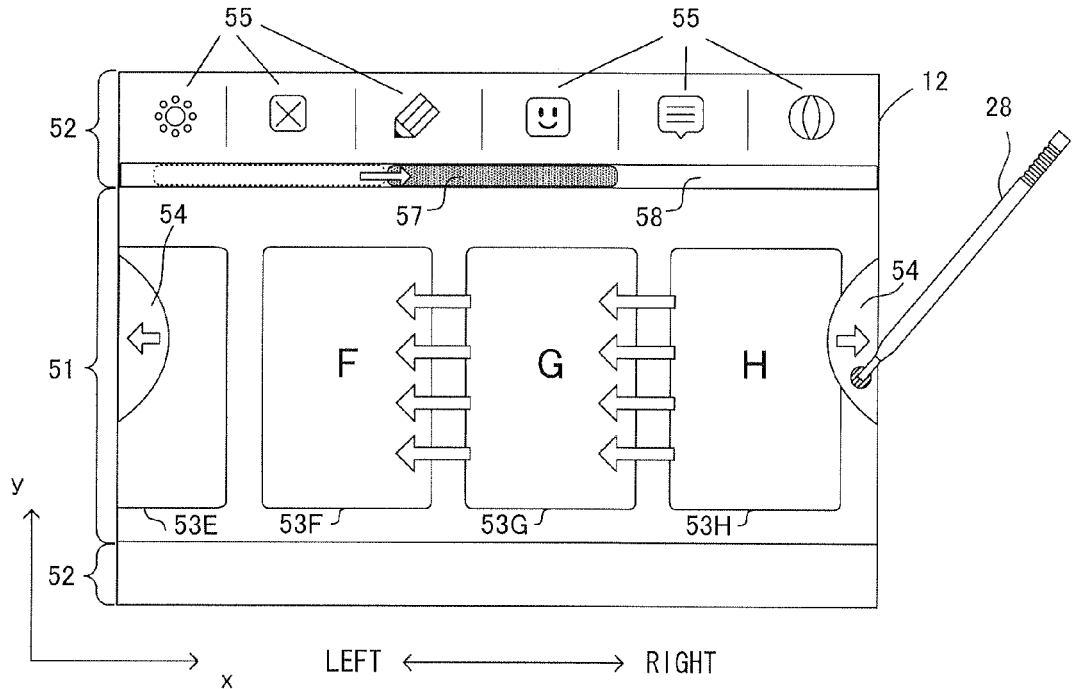
FIG. 9 is a diagram showing an example of an image displayed on the screen of the lower LCD 12.
Figure 10:
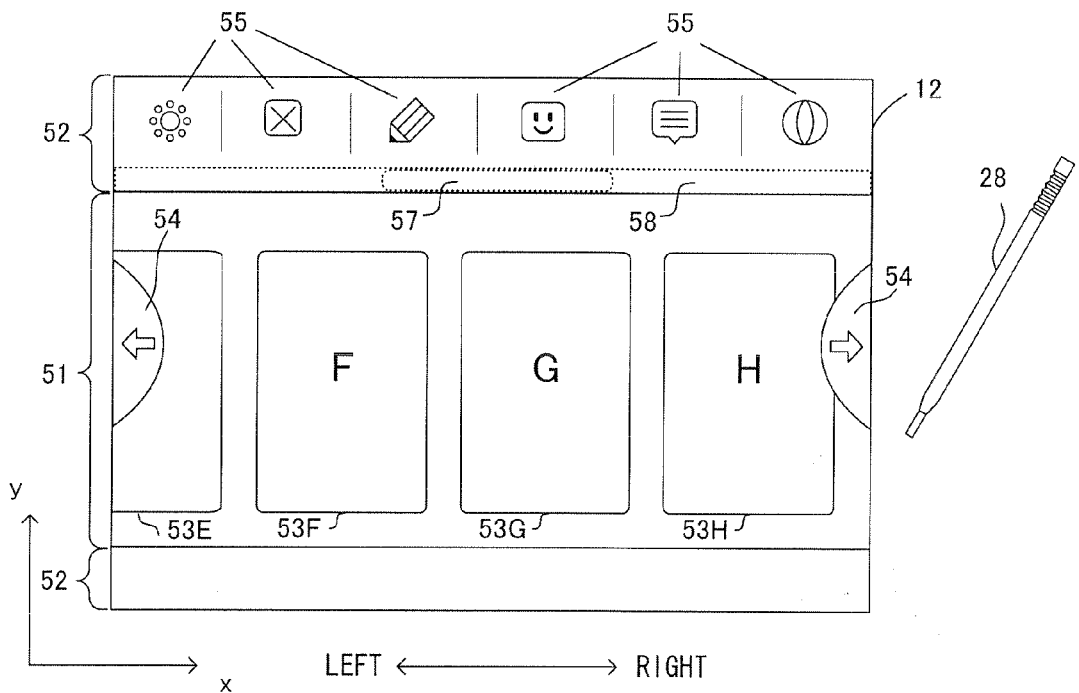
FIG. 10 is a diagram showing an example of an image displayed on the screen of the lower LCD 12.

FIG. 7 shows a scene when the user touches on the screen shifting button 54 with the touch pen 28 on a content selection screen shown in FIG. 5. FIG. 8 to FIG. 10 show scenes in which, when the screen shifting button 54 is touched on as shown in FIG. 7, a screen (a part of the content 61) displayed in the content display area 51 is switched, and the scrolling indicator 57 is displayed and then disappears.

In order to switch a screen displayed in the content display area 51, the user touches on the screen shifting button 54 displayed in the content display area 51 with the touch pen 28 as shown in FIG. 7.

As shown in FIG. 8, when the user touches on the screen shifting button 54 with the touch pen 28, the scrolling indicator 57 and a scrolling frame 58 are displayed in the upper non-content display area 52. The scrolling indicator 57 enables the user to visually comprehend the ratio of a range currently displayed to the whole scrolling range, the position of the range currently displayed, in the whole scrolling range, and the like. It is noted that although in the present embodiment, the scrolling frame 58 is displayed, the scrolling frame 58 may not be displayed and only the scrolling indicator 57 may be displayed.

Here, the whole scrolling range means the entirety of the content 61 shown in FIG. 6, and the range currently displayed means the area A of the content 61 shown in FIG. 6. The length in the long-side direction (x-axis direction) of the scrolling frame 58 shown in FIG. 8 corresponds to the length in the long-side direction of the whole scrolling range shown in FIG. 6 that is reduced at a certain ratio. The length in the long-side direction of the scrolling indicator 57 corresponds to the length in the long-side direction of the range currently displayed (area A) that is reduced at the same ratio as the certain ratio. In addition, the position in the long-side direction (x-axis direction) of the area A with respect to the whole scrolling range is indicated by the position in the long-side direction (x-axis direction) of the scrolling indicator 57 with respect to the scrolling frame 58. Therefore, when the position of the area A is shifted relative to the whole scrolling range by scrolling processing or the like, the scrolling indicator 57 gradually moves in the long-side direction (x-axis direction) in the scrolling frame 58 in accordance with the shifting of the area A.

That is, in the case where the current position of the area A of the content 61 is as shown in FIG. 6(1), a part (area A) of the content 61 is displayed in the content display area 51, and the scrolling indicator 57 is displayed in the upper non-content display area 52, as shown in FIG. 8. Thus, the user can visually recognize a range currently displayed in the whole scrolling range.

Next, screen shifting of the content display area 51 is performed. For example, if the area A of the content 61 has shifted from the position shown in FIG. 6(1) to the position shown in FIG. 6(3), screen shifting of the content display area 51 is performed as shown in FIG. 9. That is, since the content 61 has shifted leftward relative to the area A, a screen (a part of the content 61) displayed in the content display area 51 shifts leftward, whereby the displayed screen is switched.

Along with this, the scrolling indicator 57 gradually moves rightward (in the positive direction of the x-axis) in the scrolling frame 58, thereby indicating at which position in the entirety of the content 61 the area A currently displayed in the content display area 51 is present, (or how much the area A has moved).

Next, when the user has made the touch pen 28 touch off the screen shifting button 54, the scrolling indicator 57 and the scrolling frame 58 gradually become translucent, and then disappear in, for example, 40 ms (see FIG. 10).

As described above, the scrolling indicator 57 is displayed in the case where the user makes the touch pen 28 touch on the screen shifting button 54 to perform display switching in which a part (area A) of the content 61 displayed in the content display area 51. The display position of the scrolling indicator 57 in the scrolling frame 58 at the beginning indicates the position of the area A with respect to the entirety of the content 61 that is before display switching. After the screen (a part of the content 61) displayed in the content display area 51 has switched, the position of the scrolling indicator 57 in the scrolling frame 58 indicates the position of the area A with respect to the entirety of the content 61 that is after display switching. Therefore, by visually recognizing the change in the display position of the scrolling indicator 57 between before and after the display switching, the user can recognize to which position in the entirety of the content 61 the part displayed in the content display area 51 has shifted.

Figure 11:
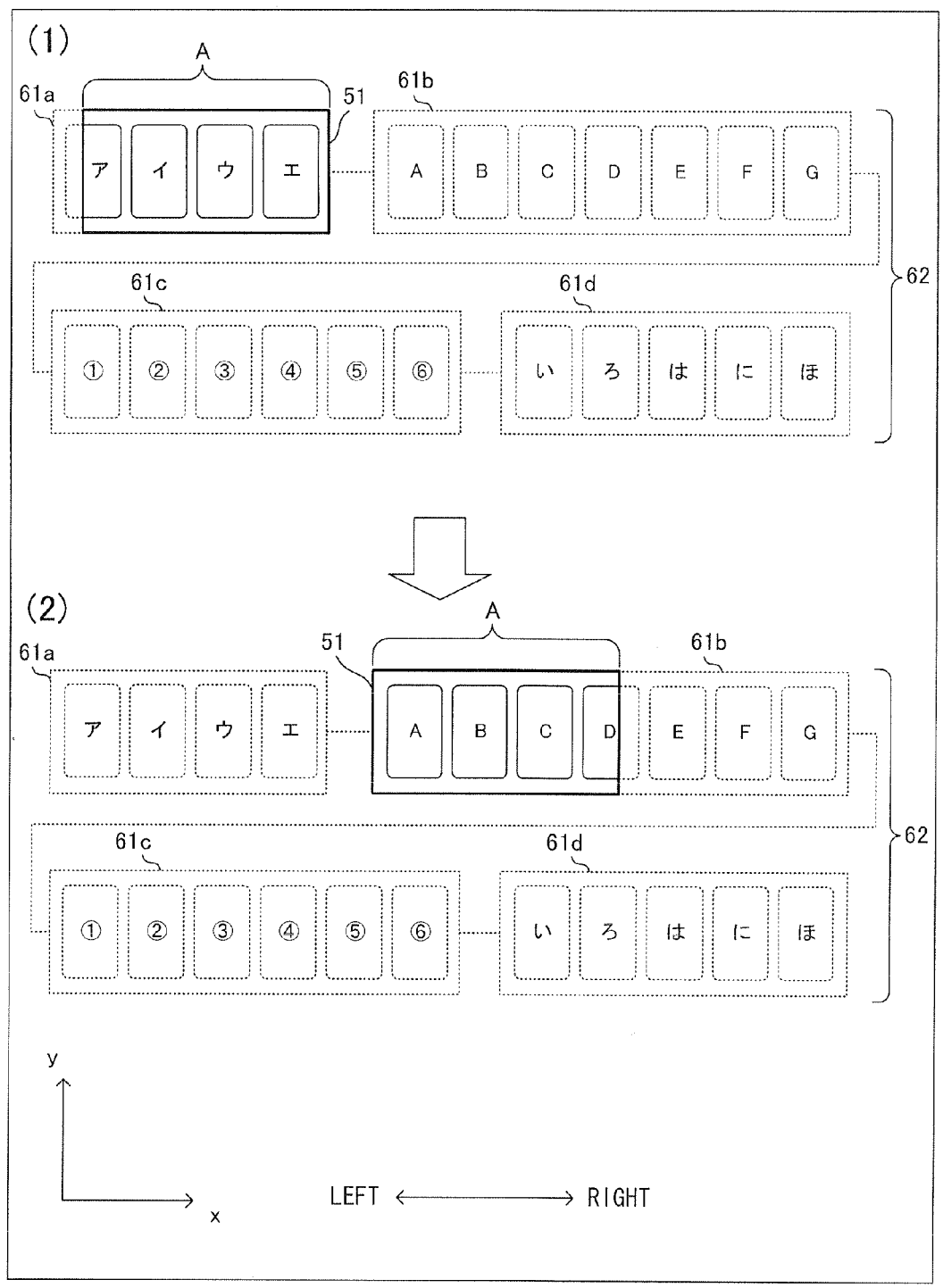
FIG. 11 is a diagram showing an example of a relation between the content 61 and the content display area 51.

FIG. 11 is an image diagram illustrating a case where a plurality of different contents 61a to 61d are connected to form a composite content 62, the sizes of the contents 61a to 61d being assumed to be different. As shown in FIG. 11, the contents 61a to 61d are adjacently placed in order, 61a, 61b, 61c, 61d, starting from the left, they forming the composite content 62. For example, if the screen shifting button 54 displayed in the right-end portion of the content display area 51 is touched on, the area A shifts rightward relative to the composite content 62. Then, if the area A has reached the right end of a content (content 61a) (see FIG. 11(1)), the area A shifts to the left end of a content (content 61b) that is adjacent to the right end of the content 61a (see FIG. 11(2)). That is, by the screen shifting button 54 being touched on, a part (area A) of the composite content 62 displayed in the content display area 51 shifts among the contents 61a to 61d. At the timing of the shifting thereamong, display switching in which a part of one of the contents 61a to 61d displayed in the content display area 51 is switched to a part of another one of the contents 61a to 61d, is performed. It is noted that in the present embodiment, if the area A has reached the right end of the content 61d, the area A does not shift rightward any longer. However, if the area A has reached the right end of the content 61d, the area A may shift to the left end of a content (content 61a) that is positioned at the left end of the composite content 62. That is, the area A may shift among the contents in cycles.

Figure 12:
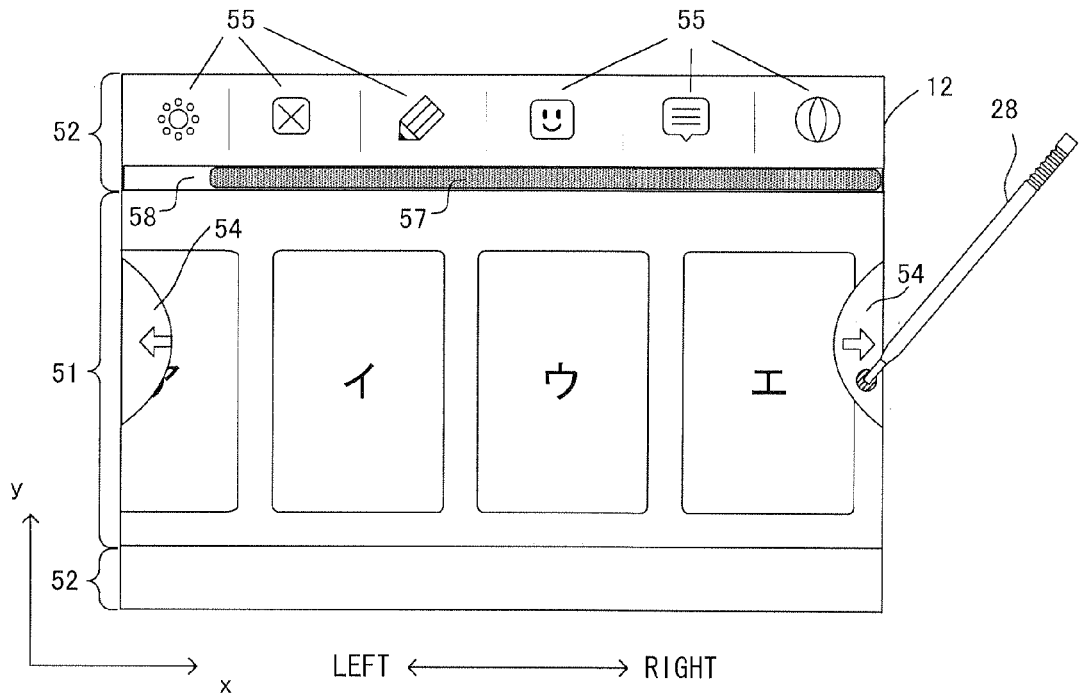
FIG. 12 is a diagram showing an example of an image displayed on the screen of the lower LCD 12.

In the case where, as shown in FIG. 11(1), the area A is currently positioned at the right end of the content 61a, and the user is touching on the screen shifting button 54, the scrolling indicator 57 is displayed as shown in FIG. 12. That is, the range and the position of the area A (a part of the content 61a displayed in the content display area 51) in a whole area which is, in this case, the content 61a, are indicated by the length of the scrolling indicator 57 and the display position of the scrolling indicator 57 in the scrolling frame 58.

Figure 13:
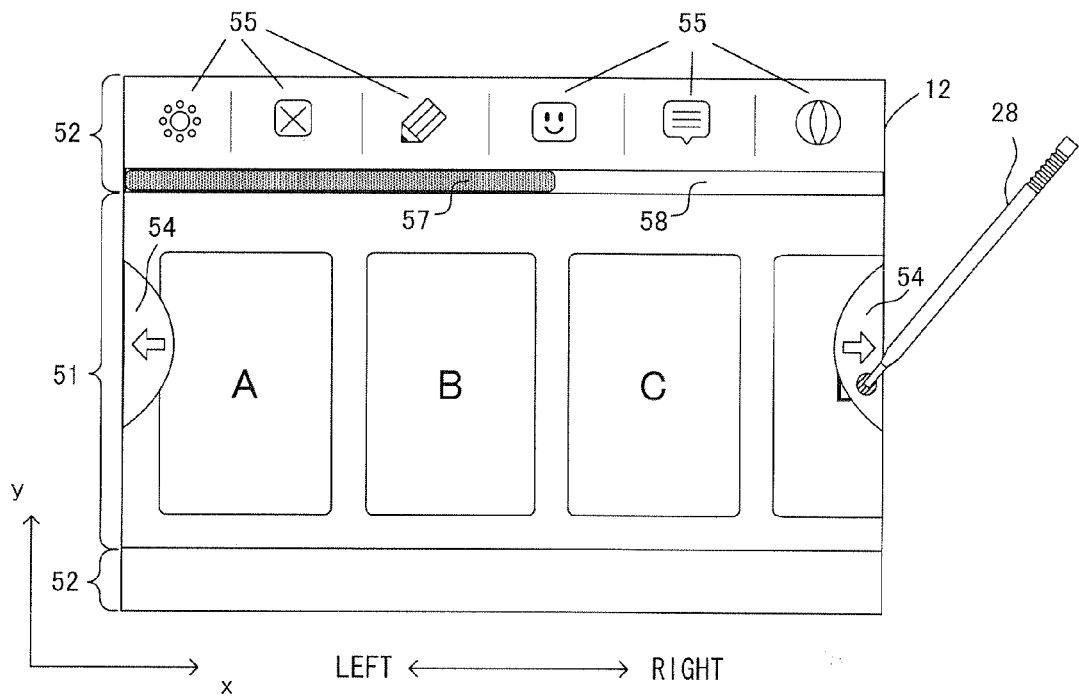
FIG. 13 is a diagram showing an example of an image displayed on the screen of the lower LCD 12.

Next, by the screen shifting button 54 being touched on, as shown in FIG. 11(2), the area A shifts to the left end of the content 61b, and the screen (a part of the content 61) displayed in the content display area 51 is switched. In this case, the scrolling indicator 57 after the display switching is displayed as shown in FIG. 13. That is, the range and the position of the area A (a part of the content 61b displayed in the content display area 51) in a whole area which is, in this case, the content 61b, are indicated by the length of the scrolling indicator 57 and the display position of the scrolling indicator 57 in the scrolling frame 58.

As described above, in the case where a part of a content to be displayed is shifted to a part of another content having a size different from the content by display switching, the size (length) of the scrolling indicator 57 varies depending on the size of the entirety of each content. Therefore, by the scrolling indicator 57 being displayed before and after the display switching, the user can visually recognize the size of the entirety of a new content after the switching.

Next, a case where the user touches on a position other than the screen shifting button 54 with the touch pen 28 will be described. It is noted that hereinafter, in the content display area 51, an area in which each in-content button 53 is placed is referred to as a first area, and an area in which none of the in-content buttons 53 and the screen shifting button 54 are placed is referred to as a second area.

Figure 14:
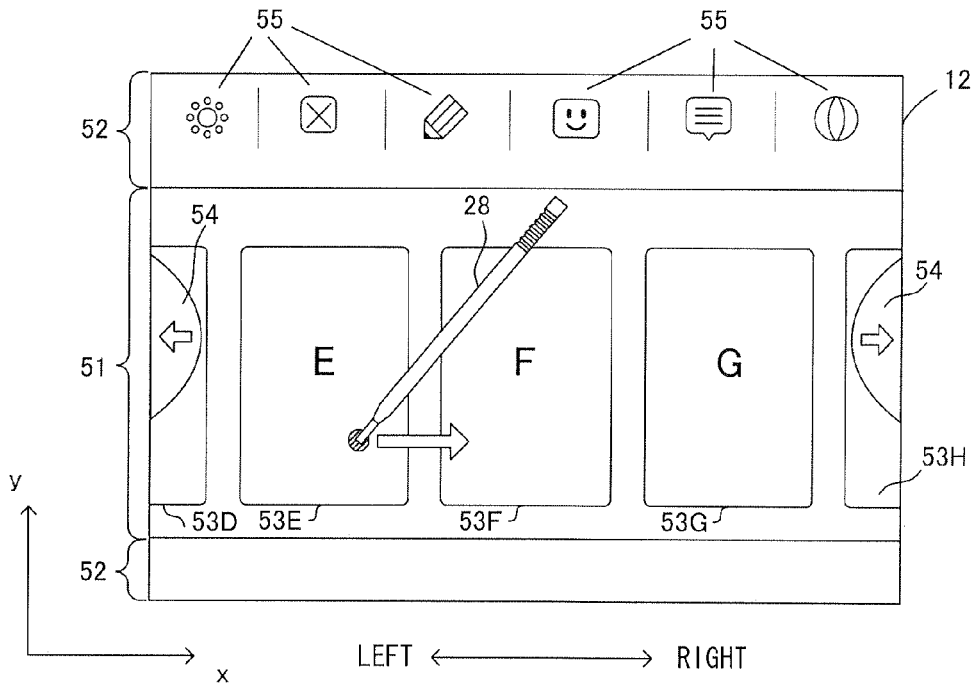
FIG. 14 is a diagram showing an example of an image displayed on the screen of the lower LCD 12.
Figure 15:
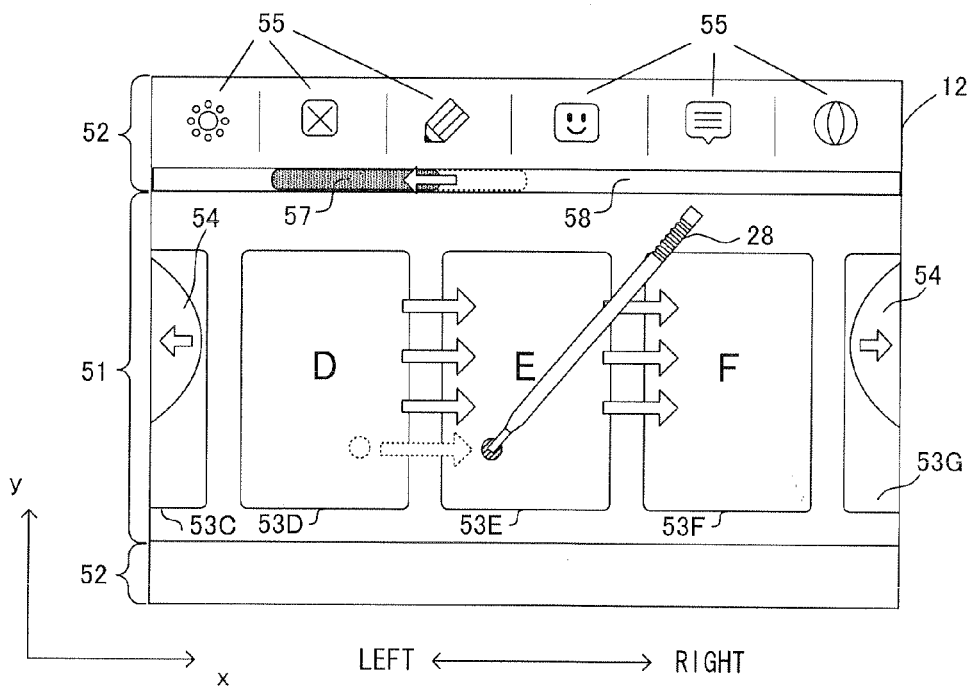
FIG. 15 is a diagram showing an example of an image displayed on the screen of the lower LCD 12.
Figure 16:
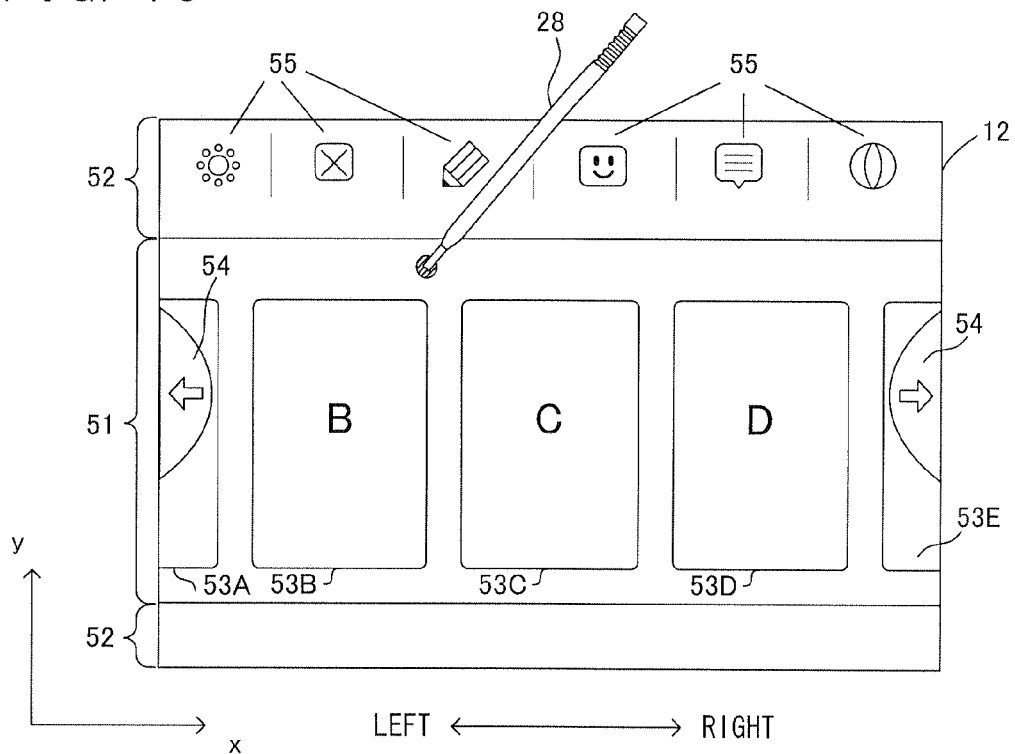
FIG. 16 is a diagram showing an example of an image displayed on the screen of the lower LCD 12.
Figure 17:
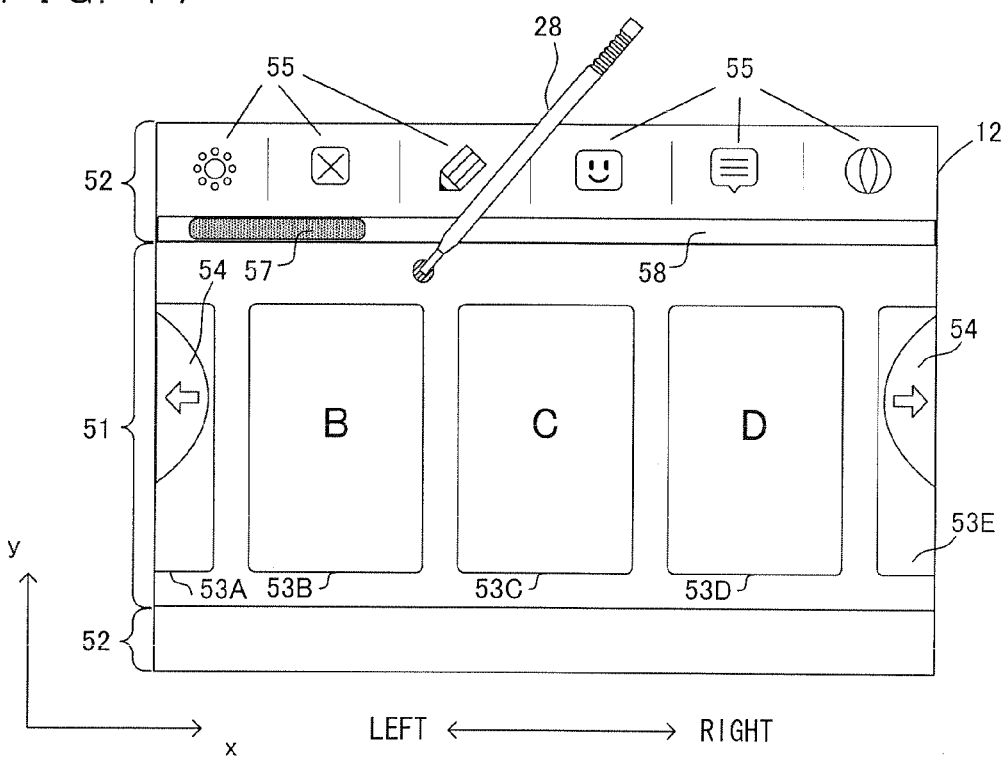
FIG. 17 is a diagram showing an example of an image displayed on the screen of the lower LCD 12.

FIG. 14 and FIG. 15 show a case in which the first area is touched on in the content selection screen shown in FIG. 5. FIG. 16 and FIG. 17 show a case in which the second area is touched on in the content selection screen shown in FIG. 5. It is noted that hereinafter, an operation of sliding the touch pen 28 while the user touching on the touch panel 13 of the lower LCD 12 with the touch pen 28 (sliding the touch pen 28 while making the touch pen 28 in contact with the screen), is referred to as a "dragging operation".

In the case where the user touches on the first area (the in-content button 53 in the content display area 51) with the touch pen 28 as shown in FIG. 14, a timing of displaying the scrolling indicator 57 changes depending on a subsequent operation of the touch pen 28.

In the case where the user touches on the first area with the touch pen 28 and then performs a dragging operation to slide the touch pen 28 rightward, the scrolling indicator 57 is displayed at the same time as it is determined that the dragging operation has been performed. On the other hand, in the case where the user does not perform a dragging operation, the scrolling indicator 57 is displayed if a time from the touching on to touching off (time during which a state of the touching on continues) exceeds a predetermined time period (for example, 30 ms), and the scrolling indicator 57 is not displayed if the time does not exceed the predetermined time period. It is noted that the scrolling indicator 57 displayed at this time indicates the range and the position, in the entirety of the content 61, of the area A currently displayed in the content display area 51.

In the case where, in a state shown in FIG. 14, the user touches on one button (first area) of the in-content buttons 53 with the touch pen 28 and then performs a dragging operation rightward (in the positive direction of the x-axis), the screen (a part of the content 61) displayed in the content display area 51 is scrolled rightward by a distance corresponding to the sliding amount of the touch pen 28 as shown in FIG. 15. On the other hand, in the case where the user touches on one button of the in-content buttons 53 with the touch pen 28 and then performs a dragging operation leftward, the screen displayed in the content display area 51 is scrolled leftward by a distance corresponding to the sliding amount of the touch pen 28. In this manner, by touching on the first area with the touch pen 28 and then sliding leftward or rightward the touch pen 28, the user can scroll leftward or rightward the screen displayed in the content display area 51. As a result, contents included in the content 61 are also scrolled, whereby contents that have not been displayed on the screen can be displayed.

By the screen (a part of the content 61) displayed on the content display area 51 being scrolled leftward or rightward by a dragging operation, the position, in the entirety of the content 61, of the area A currently displayed in the content display area 51 is shifted. Therefore, the display position of the scrolling indicator 57 in the scrolling frame 58 is also moved (see FIG. 15).

As described above, in the case where the user performs a dragging operation immediately after touching on the first area with the touch pen 28, the scrolling indicator 57 is immediately displayed, and the display position of the scrolling indicator 57 is moved in accordance with scrolling processing. Therefore, during a dragging operation, the user can visually recognize the position and the range, in the entirety of the content 61, of the area A currently displayed in the content display area 51.

It is noted that, in the case where the user touches on the in-content button 53 in the first area with the touch pen 28 and touches off the same in-content button 53 without performing a dragging operation, a program associated with the in-content button 53 is executed.

The reason why, as described above, a timing of displaying the scrolling indicator 57 is set so as to change depending on an operation of the touch pen 28 performed after the user has touched on a certain in-content button 53 in the first area with the touch pen 28, is as follows.

At the time when the user has touched on the in-content button 53 in the first area, the user can select whether to execute a program associated with the in-content button 53 or execute the scrolling processing of the screen. Therefore, whether or not the touching on performed at this time is for executing a program associated with the in-content button 53 cannot be determined. Accordingly, a timing of displaying the scrolling indicator 57 is changed depending on whether or not the user intends to execute a program associated with the in-content button 53. That is, if the user performs a dragging operation immediately after touching on the in-content button 53, since scrolling processing is to be performed, it is determined that the user does not intend to execute a program associated with the in-content button 53, and the scrolling indicator 57 is immediately displayed for the dragging operation. On the other hand, if the user does not perform a dragging operation immediately after the touching on, whether or not to display the scrolling indicator 57 is determined depending on a time from the touching on to touching off. That is, if a time from the touching on to touching off does not exceed a predetermined time period, it is determined that the user intends to execute a program associated with the in-content button 53, and the scrolling indicator 57 is not displayed. On the other hand, if a time from the touching on to touching off exceeds a predetermined time period, it is determined that the user does not intend to execute a program associated with the in-content button 53 and that the user intends to perform dragging processing after the touching on, and the scrolling indicator 57 is displayed at the same time as the predetermined time period has passed. It is noted that in the case where, after the scrolling indicator 57 has been displayed, the user has touched off the same in-content button 53 without performing a dragging operation, it is determined that the user intends to execute a program associated with the in-content button 53, and the program associated with the in-content button 53 is executed.

In the case where the user touches on the second area (area in the content display area 51 excluding the in-content buttons 53) with the touch pen 28 as shown in FIG. 16, the user has only a choice of executing scrolling processing of the screen. Therefore, it is considered that the user intends to perform a dragging operation (operation of scrolling the screen displayed in the content display area 51). Accordingly, the scrolling indicator 57 is displayed at the same time as the touching on (see FIG. 17). Thereafter, when the user has performed a dragging operation with the touch pen 28, as described above, the screen (a part of the content 61) displayed in the content display area 51 is shifted in accordance with the dragging amount of the dragging operation, and at the same time, the display position of the scrolling indicator 57 is also moved.

It is noted that in the case where the user touches on the non-content display area 52 with the touch pen 28, it is determined that the user does not intend to perform display switching or scrolling processing. Therefore, the scrolling indicator 57 is not displayed. In addition, in the case where the user touches on the out-of-content button 55, a program associated with the out-of-content button 55 is executed. It is noted that the program may be executed not when the user has touched on the out-of-content button 55, but when the user has touched off the out-of-content button 55.

As described above, in the case where the user touches on an area (first area) that allows scrolling processing or other processing (processing of executing a program associated with the in-content button 53) to be executed, the scrolling indicator 57 is displayed when the user has performed an operation (a dragging operation) for selecting scrolling processing. In addition, in the case where the user does not touch off or perform a dragging operation during a predetermined time period after touching on the first area, it is determined that the user does not intend to perform the other processing, and the scrolling indicator 57 is displayed, thereby indicating, to the user, that the user can perform scrolling processing. On the other hand, in the case where the user touches on an area (second area) that allows only scrolling processing to be executed, the scrolling indicator 57 is immediately displayed, thereby indicating, to the user, that the user can execute only scrolling processing. Thus, even if the user does not perform a dragging operation during a predetermined time period after touching on, a timing of displaying the scrolling indicator 57 changes depending on whether the user has touched on the first area or the second area. As a result, the user can easily comprehend whether the user can execute only scrolling processing or the user can execute scrolling processing and the other processing. In addition, based on the display position of the scrolling indicator 57 which is displayed at an appropriate timing, the user can visually recognize the position and the range, in the entirety of the content 61, of the screen (a part of the content 61) currently displayed in the content display area 51. In addition, display of the scrolling indicator, and the scrolling processing can be performed so as to precisely reflect the intention of the user in the operation.

[Memory Map]

Figure 18:
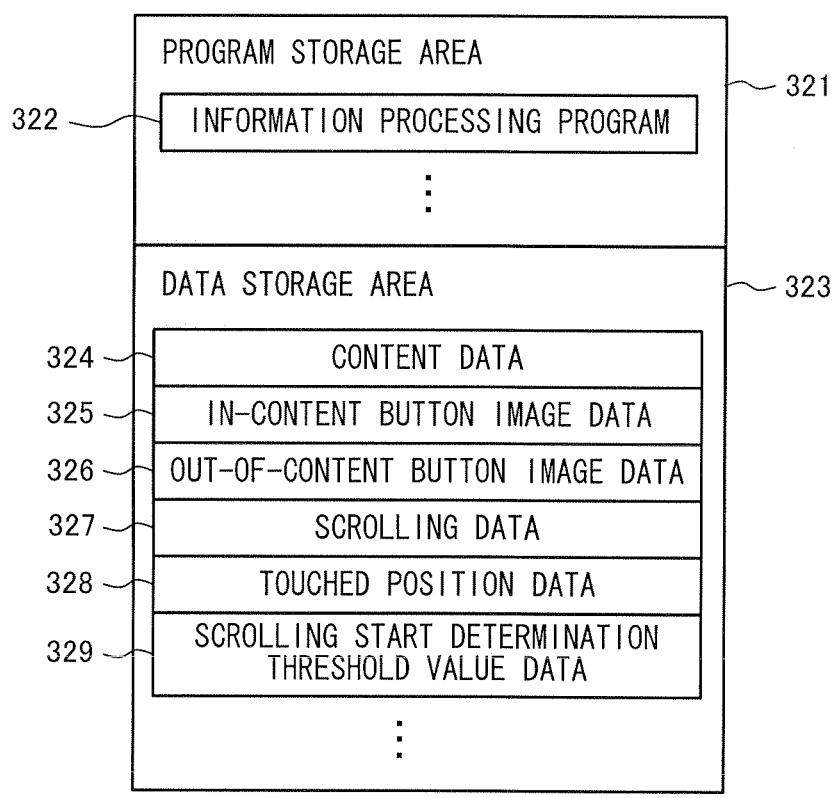
FIG. 18 is a memory map of a main memory 32.

Hereinafter, with reference to FIG. 18, data that is stored in the main memory 32 in information processing will be described. Here, FIG. 18 is a memory map of the main memory 32. As shown in FIG. 18, the main memory 32 includes a program storage area 321 and a data storage area 323. The program storage area 321 stores a program to be executed by the CPU 311. The data storage area 323 stores various types of data needed for the information processing. The program in the program storage area 321 and a part of data in the data storage area 323 are data stored in advance in the external memory 45, which is loaded, upon the game processing, from the external memory 45 onto the program storage area 321 and the data storage area 323.

The program storage area 321 stores an information processing program 322 and the like. The information processing program 322 is a program for causing the CPU 311 to execute series of steps of processing shown in FIG. 19 and FIG. 20.

The data storage area 323 stores content data 324, in-content button image data 325, out-of-content button image data 326, scrolling data 327, touched position data 328, scrolling start determination threshold value data 329, and the like.

The content data 324 includes data indicating which of parts of contents 61 (61a to 61d or the like) the area A corresponds to, data indicating the sizes of the contents 61, and data indicating the position of the area A. The content data 324 is updated every time the screen (a part of the content 61) displayed in the content display area 51 is switched by an operation of touching on the screen shifting button 54 or a dragging operation with the touch pen 28.

The in-content button image data 325 is data of images respectively corresponding to the in-content buttons 53. The out-of-content button image data 326 is data of images respectively corresponding to the out-of-content button 55.

The scrolling data 327 is data indicating the size (length) and the display position of the scrolling indicator 57. The data indicating the size of the scrolling indicator 57 is updated every time the size of the content 61 is updated. In addition, the data indicating the display position of the scrolling indicator 57 is updated every time the screen displayed in the content display area 51 is shifted by an operation of touching on the screen shifting button 54 or a dragging operation with the touch pen 28.

The touched position data 328 is data indicating a position (touched position) on the touch panel 13 that is designated by the touch pen 28. During the information processing, for example, processing of determining whether or not the first area is being touched on by the touch pen 28 is performed based on the designated position indicated by the touched position data 328. In addition, the touched position data 328 stores data of positions that are touched from when the user touches on the touch panel up to when the user touches off, that is, a trajectory of the touched positions.

The scrolling start determination threshold value data 329 is data of a threshold value used for, when the position (touched-on position) designated by the touch pen 28 indicated by the touched position data 328 has moved from the original touched-position, determining whether or not the movement is for executing processing of starting scrolling.

It is noted that though not shown, the data storage area 323 stores sound data used in the information processing, data that relates to control of a virtual camera for displaying a virtual game space on the screen, and the like. Such data does not directly relate to the present invention, and the description thereof is omitted.

[Processing Executed by CPU 311]

Next, with reference to flowcharts shown in FIG. 19 and FIG. 20, processing that is executed by the CPU 311 will be described. It is noted that series of steps of processing described below are performed in accordance with the CPU 311 or an instruction given by the CPU 311, based on the information processing program 322 stored in the main memory 32. In addition, although in the flowcharts, steps of processing of generation and output of an image are omitted, the generation and output of an image are performed at certain intervals.

Prior to description of the flowcharts, first, display of a content selection screen in an initial state will be described as a premise.

Setting information needed for displaying the content selection screen in an initial state is read out from the data storage area 323 in the main memory 32. Specifically, the CPU 311 reads out the content data 324, the in-content button image data 325, and the out-of-content button image data 326 from the data storage area 323. Then, the CPU 311 displays the content selection screen on the lower LCD 12. Specifically, the CPU 311 determines a part (area A) of the content 61 that is to be displayed on the lower LCD 12, based on the content data 324. Then, the CPU 311 displays the in-content buttons 53 in the content display area 51, by using the in-content button image data 325. In addition, the CPU 311 displays the out-of-content buttons 55 in the non-content display area 52, by using the out-of-content button image data 326.

Hereinafter, processing that is executed by the CPU 311 when the user has touched on the screen of the lower LCD 12 displaying the content selection screen in an initial state as described above, will be described.

Figure 19:
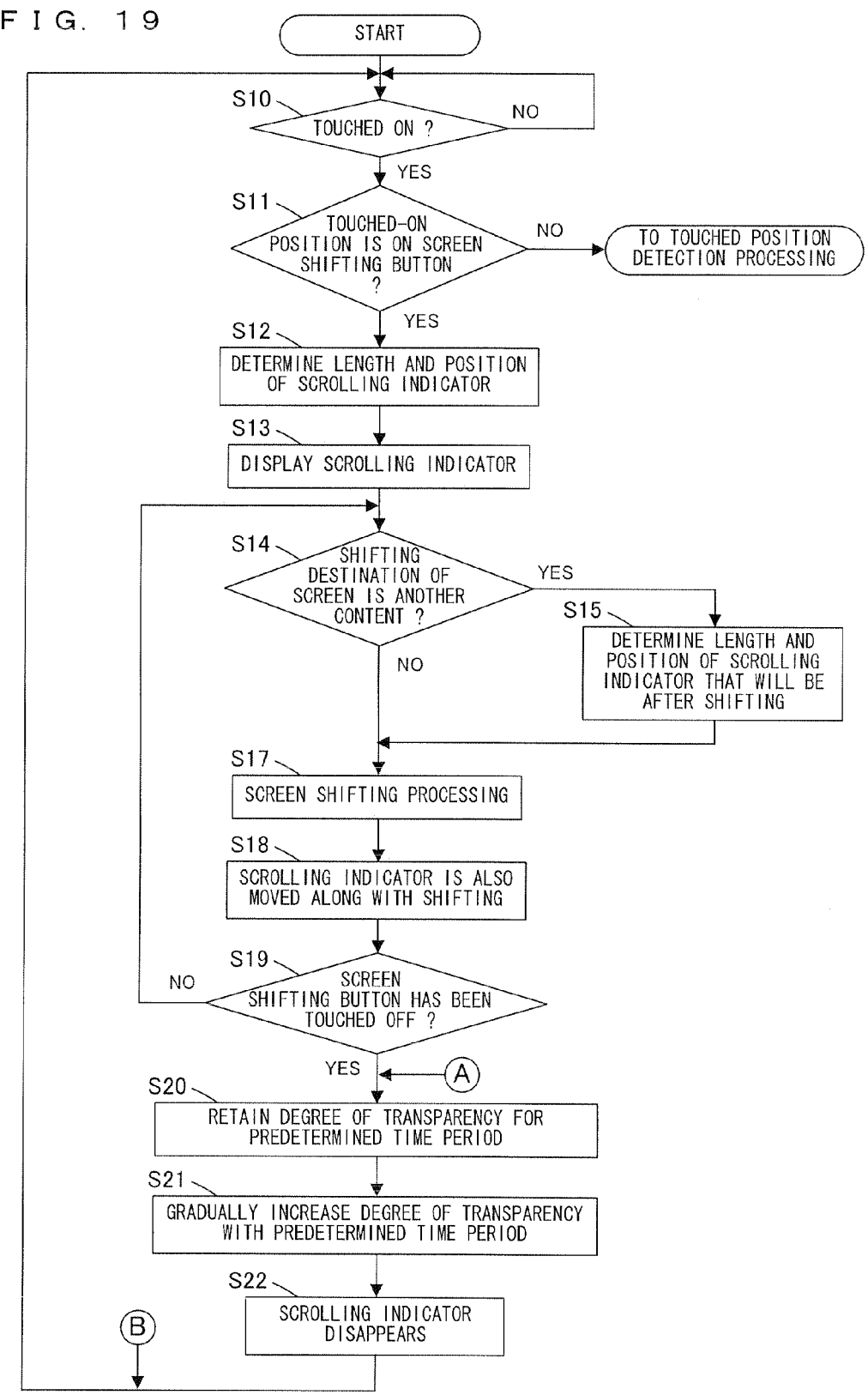
FIG. 19 is a flowchart showing an example of processing executed by a CPU 311.

As shown in FIG. 19, first the CPU 311 determines whether or not the touch panel 13 (an example of input means in the present invention) has been touched on by the touch pen 28, based on the touched position data 328 (step S10). If the CPU 311 has determined that the touch panel 13 is not touched on (NO in step S10), the CPU 311 repeats the processing of step S10 until the CPU 311 determines that the touch panel 13 has been touched on. On the other hand, if the CPU 311 has determined that the touch panel 13 has been touched on (YES in step S10), the CPU 311 determines whether or not the touched-on position is on the screen shifting button 54 (step S11).

If the CPU 311 has determined that the touched-on position is not on the screen shifting button 54 (NO in step S11), the CPU 311 proceeds to touched position detection processing. It is noted that the touched position detection processing will be described later. On the other hand, if the CPU 311 has determined that the touched-on position is on the screen shifting button 54 (YES in step S11), the CPU 311 proceeds to step S12.

In step S12, with reference to the scrolling data 327, the CPU 311 determines the size (length) and the position of the scrolling indicator 57. It is noted that the scrolling data 327 has been updated to the latest data by the CPU 311.

Next, in step S13, the CPU 311 which functions as scrolling indicator display means displays the scrolling indicator 57 on the lower LCD 12, based on the size and the display position of the scrolling indicator 57 determined in step S12.

Next, in step S14, the CPU 311 determines whether or not a shifting destination of the area A displayed in the content display area 51 is another content. If the CPU 311 has determined that the shifting destination is another content (YES in step S14), the CPU 311 calculates a length and a position of the scrolling indicator that will be after the area A shifts (step S15). The screen shifting in this case is as shown in FIG. 11, for example. Therefore, specifically, the CPU 311 reads out data (in an example shown in FIG. 11, data of the size of the content 61b) of the size of the other content to which the area A shifts, from the content data 324. Then, based on the read data, the CPU 311 determines data indicating the size and the display position of the scrolling indicator 57, and updates the scrolling data 327. Thereafter, the CPU 311 proceeds to step S17.

On the other hand, if, in step S14, the CPU 311 has determined that the shifting destination is not another content (NO in step S14), that is if the CPU 311 has determined that the shifting destination is another part of the same content; or after the processing of step S15, the CPU 311 which functions as display switching means performs screen shifting processing of the screen displayed in the content display area 51 (step S17). Specifically, the area A is shifted relative to the content 61 by the length of a predetermined frame (for example, the length of the area A shown in FIG. 6(3)) in accordance with a time during which the screen shifting button 54 is touched on, and then the area A that has been shifted is displayed in the content display area 51 as a part of the content 61.

Next, in step S18, the CPU 311 updates the scrolling data 327 in accordance with the shifting of the screen performed in the screen shifting processing of step S17. Then, based on the updated scrolling data 327, the CPU 311 displays the scrolling indicator 57. As described above, the scrolling data 327 is updated every time the screen displayed in the content display area 51 is shifted by, for example, the user's operation of touching on a part of the touch panel 13 corresponding to the screen shifting button 54. Therefore, the position where the scrolling indicator 57 is displayed is also moved in accordance with the shifting of the screen. It is noted that in step S18 after the CPU 311 has determined YES in step S14, the CPU 311 displays the scrolling indicator 57, based on the scrolling data 327 updated in step S15. Therefore, in this case, in addition to the position where the scrolling indicator 57 is displayed, the length of the scrolling indicator 57 is also changed in accordance with the shifting of the screen Next, in step S19, the CPU 311 determines whether or not the user has touched off the screen shifting button 54. If the CPU 311 has determined that the user has not touched off the screen shifting button 54 (NO in step S19), the CPU 311 returns to step S14, and repeats the processing from steps S14 to S18 until the user touches off.

On the other hand, if the CPU 311 has determined that the user has touched off the screen shifting button 54 (YES in step S19), the CPU 311 retains the degree of transparency of display of the scrolling indicator 57 during a predetermined time period (for example, 60 ms) (step S20). Thereafter, the CPU 311 gradually increases the degree of transparency with a predetermined time period (for example, 40 ms) (step S21), and finally, makes display of the scrolling indicator 57 disappear (step S22).

Thus, when the user has touched on the screen shifting button 54, the scrolling indicator 57 is displayed before and after the shifting of the screen. When the user has touched off a part of the touch panel 13 corresponding to the screen shifting button 54, the scrolling indicator 57 continues to be displayed during a certain time period, and then gradually becomes transparent to disappear.

In addition, as described above, in the case where, in display switching, the area A displayed in the content display area 51 shifts from a part of a content to a part of another content having a size different from the content, the size (length) of the scrolling indicator 57 to be displayed is also changed, which size is determined based on the size of the entirety of the other content to which the area A shifts.

Next, in step S11, the touched position detection processing performed if the CPU 311 has determined that the screen shifting button 54 is not touched on (NO in step S11) will be described.

Figure 20:
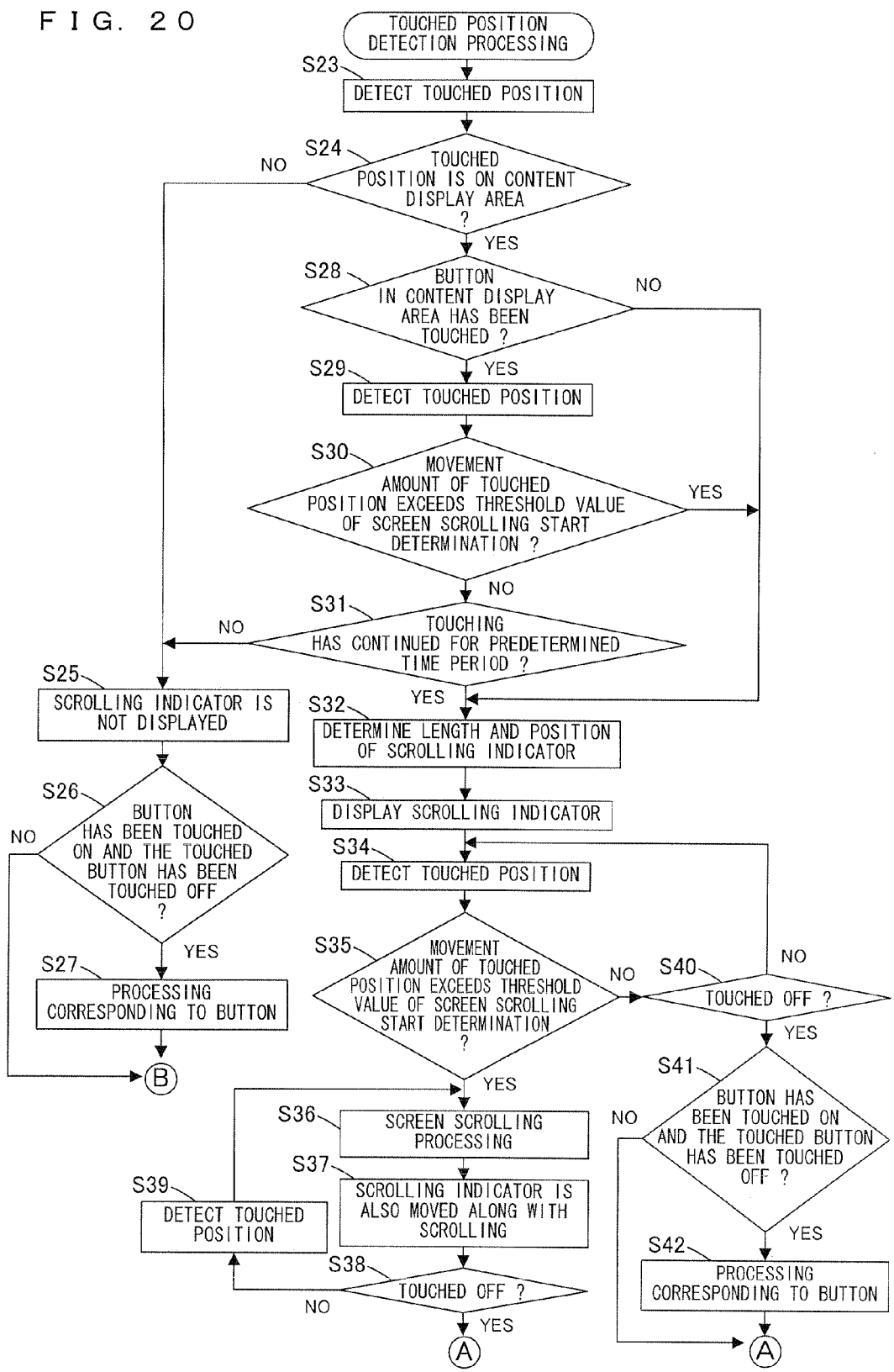
FIG. 20 is a flowchart showing an example of processing executed by the CPU 311.

As shown in FIG. 20, in the touched position detection processing, the CPU 311 which functions as designated position detection means detects the touched position on the screen (step S23). Specifically, based on the touched position data 328, the CPU 311 detects the position on the touch panel 13 that is being touched by the touch pen 28. In the present embodiment, the touched position is represented by coordinates (X, Y) in a 2-dimensional coordinate system in which the long-side direction of the screen of the lower LCD 12 shown in FIG. 14 is the X-axis direction, and the direction perpendicular to the X-axis direction is the Y-axis direction.

After detecting the touched position, the CPU 311 determines whether or not the touched position (in this case, touched-on position) indicated by the touched position data 328 is on the touched position content display area 51 (step S24). If the CPU 311 has determined that the touched-on position is not on the content display area 51 (NO in step S24), the CPU 311 does not display the scrolling indicator 57 because it is considered that a position on the non-content display area 52 is designated (step S25).

After step S25, the CPU 311 determines, based on the touched position data 328, whether or not: the touched-on position is on one of the out-of-content buttons 55 in the non-content display area 52; the touch panel 13 has been touched off; and the touched-off position is on the same one of the out-of-content buttons 55 (step S26). That is, the CPU 311 determines whether or not the out-of-content button 55 has been touched on and the same out-of-content button 55 has been touched off.

If the CPU 311 has determined that the out-of-content button 55 has been touched on and the same out-of-content button 55 has been touched off (YES in step S26), the CPU 311 starts a program associated with the out-of-content button 55 (step S27), and then returns to the initial step S10 (see FIG. 19). It is noted that a program associated with the out-of-content button 55 may be immediately started when the out-of-content button 55 has been touched on, before the the out-of-content button 55 is touched off.

On the other hand, if the CPU 311 has not determined that the out-of-content button 55 has been touched on and the same out-of-content button 55 has been touched off (NO in step S26), that is, if the touched-on position is not on the out-of-content buttons 55, or if the touched-on position is on the out-of-content button 55 but the touched-off position is not on the same out-of-content button 55, the CPU 311 returns to the initial step S10 (see FIG. 19).

If, in step S24, the CPU 311 has determined that the touched-on position is on the content display area 51 (YES in step S24), the CPU 311 determines whether or not the touched-on position is on the in-content button 53 (first area) in the content display area 51 (step S28). If the CPU 311 has determined that the touched-on position is not on the first area (NO in step S28), the CPU 311 proceeds to step S32.

On the other hand, if the CPU 311 has determined that the touched-on position is on the first area (YES in step S28), the CPU 311 detects the position on the touch panel 13 touched by the touch pen 28, based on the latest touched position data 328 (step S29), as in step S23.

Next, in step S30, the CPU 311 determines whether or not the displacement in the X-axis direction (long-side direction) of the touched position has exceeded a predetermined threshold value for screen scrolling start determination. Specifically, the CPU 311 determines whether or not the displacement in the X-axis direction that is indicated by the absolute value of the difference between the X-coordinate value of the touched position detected in step S23 and the X-coordinate value of the touched position detected in step S29, has exceeded the threshold value (for example, 10 dots) indicated by the scrolling start determination threshold value data 329.

If the CPU 311 has determined that the displacement in the X-axis direction of the touched position has exceeded a predetermined threshold value (YES in step S30), the CPU 311 determines that the user has given an instruction of scrolling, in the long-side direction, the screen (a part of the content 61) displayed in the content display area 51, and proceeds to step S32. Thus, the reason why the CPU 311 does not determine that an instruction of scrolling in the long-side direction has been given, until the displacement in the X-axis direction of the touched position has exceeded a predetermined threshold value (for example, 10 dots), is to exclude a displacement due to unintended hand jiggle when the user touches the touch panel 13.

On the other hand, if the CPU 311 has determined that the displacement in the X-axis direction of the touched position has not exceeded a predetermined threshold value (NO in step S30), the CPU 311 determines whether or not the touching on has continued during a predetermined time period (for example, 30 ms) (step S31). Specifically, the CPU 311 determines, based on the touched position data 328, whether or not the touch panel 13 has continued to be touched on by the touch pen 28 during a predetermined time period after the position on the touch panel 13 touched by the touch pen 28 was first detected in step S23. Alternatively, a timing counter may be provided, and the CPU 311 may determine whether or not the touch panel 13 has continued to be touched on by the touch pen 28 during a predetermined time period, based on a count value that has been counted by the timing counter since the position on the touch panel 13 touched by the touch pen 28 was first detected.

If the CPU 311 has determined that the touching on has continued during a predetermined time period (YES in step S31), the CPU 311 proceeds to step S32.

On the other hand, if the CPU 311 has determined that the touching on has not continued during a predetermined time period (NO in step S31), the CPU 311 does not display the scrolling indicator 57 (step S25). Then, the CPU 311 determines whether or not: the touched-on position is on one of the in-content buttons 53 in the content display area 51; and thereafter, the touch panel 13 has been touched off by the touch pen 28 on the same one of the in-content buttons 53, that is, the touched-off position is on the same one of the in-content buttons 53 (step S26). That is, the CPU 311 determines whether or not the touched-on position and the touched-off position are on the same in-content button 53.

If the CPU 311 has determined that the touched-on position and the touched-off position are on the same in-content button 53 (YES in step S26), the CPU 311 starts a program associated with the in-content button 53 (step S27), the CPU 311 returns to initial step S10 (see FIG. 19).

On the other hand, if the CPU 311 has determined that the touched-on position and the touched-off position are not on the same in-content button 53 (NO in step S26), that is, if the touched-on position is not on the in-content buttons 53; if the touched-on position is on the in-content button 53 but the touched-off position is not on the same in-content button 53; or if the touching on has continued during less than a predetermined time period, the CPU 311 returns to initial step S10 (see FIG. 19).

If the CPU 311 has determined that the touched-on position is not on the first area (NO in step S28); if the CPU 311 has determined that the displacement in the X-axis direction of the touched position has exceeded a predetermined threshold value (YES in step S30); or if the CPU 311 has determined that the touching on has continued during a predetermined time period (YES in step S31), the CPU 311 performs processing of step S32. In step S32, the CPU 311 determines the length (size) and the position of the scrolling indicator 57. Specifically, the CPU 311 reads out data indicating the size and the display position of the scrolling indicator 57 from the scrolling data 327.

Next, in step S33, the CPU 311 which functions as scrolling indicator display means displays the scrolling indicator 57 on the lower LCD 12, based on the data indicating the size and the display position of the scrolling indicator 57 read out in step S32.

Next, in step S34, the CPU 311 detects the position on the touch panel 13 touched by the touch pen 28, based on the latest touched position data 328, as in step S23.

Then, in step S35, the CPU 311 determines whether or not the displacement in the X-axis direction (long-side direction) of the touched position has exceeded a predetermined threshold value for screen scrolling start determination, as in step S30. Specifically, the CPU 311 determines whether or not the displacement in the X-axis direction that is indicated by the absolute value of the difference between the X-coordinate value of the touched position detected in step S23 and the X-coordinate value of the touched position detected in step S34, has exceeded the threshold value indicated by the scrolling start determination threshold value data 329.

If the CPU 311 has determined that the displacement in the X-axis direction of the touched position has exceeded a predetermined threshold value (YES in step S35), the CPU 311 determines that the user has given an instruction of scrolling, in the long-side direction, the screen (a part of the content 61) displayed in the content display area 51, and proceeds to step S36.

In step S36, the CPU 311 which functions as scrolling switching means performs scrolling processing of the screen displayed in the content display area 51 (step S36). Specifically, the CPU 311 determines a scrolling direction, based on comparison between the X-coordinate value of the touched position obtained in step S23 and the X-coordinate value of the touched position obtained in step S34, and determines a scrolling length (the amount of movement in the long-side direction of the screen displayed in the content display area 51), based on the absolute value of the difference between the two X-coordinate values. Then, the CPU 311 scrolls the screen displayed in the content display area 51 in the determined scrolling direction and by the determined scrolling length, as described above based on FIG. 15.

Next, in step S37, the CPU 311 updates the scrolling data 327 in accordance with the scrolling processing of the screen performed in step S36. Then, based on the updated scrolling data 327, the CPU 311 displays the scrolling indicator 57 on the lower LCD. As previously described, the scrolling data 327 is updated every time the screen displayed in the content display area 51 is shifted by a dragging operation and the like performed by the user using the touch pen 28. Therefore, the display position of the scrolling indicator 57 also moves along with the sliding movement of the screen performed by the scrolling processing.

Next, in step S38, the CPU 311 determines whether or not the touch pen 28 has touched off the touch panel 13, based on the touched position data 328. If the CPU 311 has determined that the touch pen 28 has not touched off the touch panel 13 (NO in step S38), the CPU 311 detects the position on the touch panel 13 touched by the touch pen 28, based on the latest touched position data 328 (step S39). Then, the CPU 311 returns to step S36, and repeats the scrolling processing of the screen (step S36), and the processing of moving the display position of the scrolling indicator 57 along with the scrolling of the screen (step S37), until the touch pen 28 touches off the touch panel 13.

On the other hand, if the CPU 311 has determined that the touch pen 28 has touched off the touch panel 13 (YES in step S38), the CPU 311 retains the degree of transparency of the display of the scrolling indicator 57 during a predetermined time period (for example, 60 ms) (step S20 in FIG. 19). Thereafter, the CPU 311 gradually increases the degree of transparency with a predetermined time period (for example, 40 ms) (step S21 in FIG. 19), and finally, makes display of the scrolling indicator 57 disappear (step S22 in FIG. 19).

On the other hand, if, in step S35, the CPU 311 has determined that the displacement in the X-axis direction of the touched position has not exceeded a predetermined threshold value (NO in step S35), the CPU 311 determines whether or not the touch pen 28 has touched off the touch panel 13 (step S40).

If the CPU 311 has determined that the touch pen 28 has not touched off the touch panel 13 (NO in step S40), the CPU 311 returns to step S34 to detect the touched position, based on the latest touched position data 328. Then, based on the touched position, the CPU 311 determines whether or not the displacement in the X-axis direction of the touched position has exceeded a predetermined threshold value (step S35). That is, as long as the touch pen 28 does not touch off the touch panel 13, the CPU 311 continues to determine whether or not the amount of the movement of the touched position has exceeded the threshold value for screen scrolling start determination.

On the other hand, if the CPU 311 has determined that the touch pen 28 has touched off the touch panel 13 (YES in step S40), the CPU 311 determines whether or not: the touched-on position is on one of the in-content buttons 53 in the content display area 51; the touch pen 28 has been touched off the touch panel 13; and the touched-off position is on the same one of the in-content buttons 53 (step S41). That is, the CPU 311 determines whether or not the touched-on position and the touched-off position are on the same in-content button 53.

If the CPU 311 has determined that the touched-on position and the touched-off position are on the same in-content button 53 (YES in step S41), the CPU 311 starts a program associated with the in-content button 53 (step S42), and then executes processing of steps S20 to S22 shown in FIG. 19, thereby eventually, making the scrolling indicator 57 disappear.

On the other hand, if the CPU 311 has determined that the touched-on position and the touched-off position are not on the same in-content button 53 (NO in step S41), that is, if the touched-on position is not on the in-content button 53 or if the touched-on position is on the in-content button 53 but the touched-off position is not on the same in-content button 53, the CPU 311 executes processing of steps S20 to S22 shown in FIG. 19, thereby eventually, making the scrolling indicator 57 disappear.

As described above, in the present embodiment, when screen shifting is performed, the scrolling indicator 57 is displayed before and after the screen shifting. Therefore, the user can visually recognize the position and the range, in the entirety of the content 61, of a part of the content 61 displayed in the content display area 51 during the display switching. In addition, in the case where the touched-on position is in an area that allows scrolling processing or other processing (for example, processing assigned to each of the in-content buttons 53) to be executed, the scrolling indicator 57 is displayed when a dragging operation has been performed or touching on has continued during a predetermined time period. In the case where the touched-on position is in an area that allows only scrolling processing to be executed, the scrolling indicator 57 is immediately displayed. Therefore, the user can easily comprehend whether the user can execute only scrolling processing or the user can execute scrolling processing and the other processing. In addition, since a timing of displaying the scrolling indicator 57 changes depending on whether or not the user performs scrolling processing or other processing, the intention of the user in the operation is precisely reflected.

[Modifications]

Figure 21:
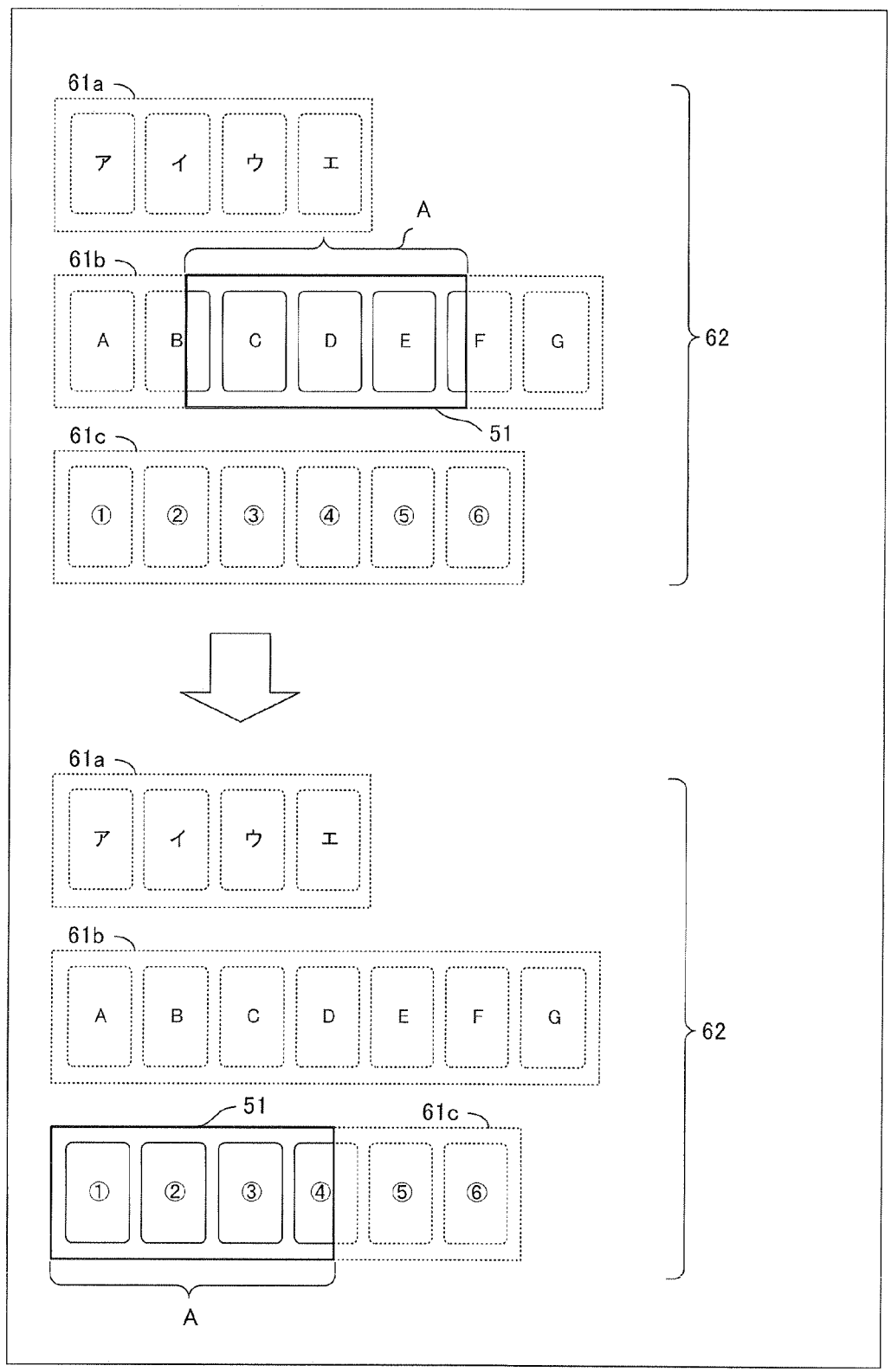
FIG. 21 is a diagram showing an example of a relation between the content 61 and the content display area 51.

It is noted that in the above embodiment, in the case where screen shifting is performed between different contents (performed in the composite content 62), the different contents 61a to 61d are adjacently placed (order of display is set), and when the area A is shifted rightward or leftward by touching on a part of the touch panel 13 corresponding to the screen shifting button 54, the shifting is performed in the predetermined order (for example, if the shifting is performed rightward, the predetermined order is 61a, 61b, 61c, 61d) (see FIG. 11). However, a method of the screen shifting for the composite content 62 is not limited to the above embodiment, and may be as shown in FIG. 21, for example. That is, the different contents 61a to 61c included in the composite content 62 may not be adjacently placed (order of display is not set), and the area A may be allowed to be shifted from an area at the middle of the content 61b to an area at the left end of the content 61c. In this case, for example, the game apparatus 10 may include a content switching button, and may be able to freely switch the contents 61 by pressing the content switching button (or touching on the corresponding part of the touch panel 13). Alternatively, the area A may be moved in the same content in accordance with scrolling processing performed by a dragging operation, and the area A may be shifted to another content by the screen shifting button 54 being touched on.

In addition, in the above embodiment, in the case where the position on the touch panel 13 touched on with the touch pen 28 by the user is on the screen shifting button 54, the screen shifting processing is performed. However, instead, the screen shifting processing may be performed by, for example, the cross button 14A or one of the buttons 14B to 14E being pressed. For example, screen shifting may be performed rightward by the cross button 14A being pressed rightward or the button 14B being pressed. In this case, the processing of step S10 shown in FIG. 19 is omitted, and in step S11, the CPU 311 determines whether or not the cross button 14A or one of the buttons 14B to 14E has been pressed. In step S19, the CPU 311 determines whether or not the cross button 14A or one of the buttons 14B to 14E that was pressed in step S11 has been released.

In addition, in the above embodiment, as shown in step S14 in FIG. 19, screen shifting in screen shifting processing can be performed among different contents 61 (YES in step S14). However, screen shifting may be performed in the same content 61. In this case, since the size of the content 61 is fixed, data indicating the size of the scrolling indicator 57 among the scrolling data 327 may be stored as a fixed value based on the size of the content 61, in the data storage area 323.

In addition, in the above embodiment, regarding the screen scrolling processing in step S36 shown in FIG. 20, a case where screen scrolling is performed in the same content 61 is described. However, screen scrolling may be performed among the different contents 61. In this case, step S14 and step S15 shown in FIG. 19 are provided between step S35 (YES) and step S36. That is, if the CPU 311 has determined that the displacement in the X-axis direction of the touched position has exceeded a predetermined threshold value (YES in step S35), the CPU 311 determines whether or not a shifting destination to which the screen will be shifted by screen scrolling is another content 61 (step S14). If the CPU 311 has determined that the shifting destination is not another content 61 (NO in step S14), the CPU 311 proceeds to step S36. On the other hand, if the CPU 311 has determined that the shifting destination is another content 61 (YES in step S14), the CPU 311 calculates a length and a position of the scrolling indicator 57, based on the the size of the other content 61 which is the shifting destination (step S15). Thereafter, the CPU 311 performs screen scrolling processing (step S36). In the same manner, step S14 and step S15 shown in FIG. 19 are provided also between step S39 and step S36.

In addition, in the above embodiment, the scrolling indicator 57 is displayed in the upper non-content display area 52. However, the scrolling indicator 57 may be displayed in the lower non-content display area 52, or may be displayed in the content display area 51. Thus, the display position is not limited.

In addition, in the above embodiment, a case where the touch panel 13 is used as input means is described as an example. However, the input means is not limited to the touch panel 13. A mouse, a joystick, or a touch pad may be used, for example.

In addition, in the above embodiment, a case where a content (image displayed in the content display area 51) of the present invention is a button image is described as an example. However, a content of the present invention may be another image, a character, a sign, or the like.

In addition, in the above embodiment, a case where the screen displayed in the content display area 51 is scrolled in the long-side direction is described as an example. However, the screen may be scrolled in the short-side direction. In this case, it is preferable that the scrolling indicator 57 is displayed along the short-side direction. Alternatively, the screen may be allowed to be scrolled in the long-side direction and in the short-side direction, and the scrolling indicator 57 may be displayed along both the long-side direction and the short-side direction.

In addition, the threshold values used in step S30 and step S35 in FIG. 20 may be set at respective appropriate values.

In addition, the predetermined time periods used in step S20 and step S21 in FIG. 19 may be set at respective appropriate values. In addition, the predetermined value used in step S20 may be set at 0 (zero), that is, processing of retaining the degree of transparency of the scrolling indicator 57 may be omitted.

In addition, in the above embodiment, a case where the game apparatus 10 includes the touch panel 13 as a unit is described as an example. However, it is understood that the present invention can be realized even if the game apparatus 10 and the touch panel are separately provided. In addition, the touch panel 13 may be provided on the upper LCD 22, and an image displayed on the lower LCD 12 as described in the above embodiment may be displayed on the upper LCD22.

In addition, in the above embodiment, a case where the hand-held game apparatus 10 is used is described. However, the present invention may be realized by an information processing apparatus such as a general personal computer executing the information processing program of the present invention. Alternatively, instead of such a game apparatus, any hand-held electronic apparatus such as a PDA (Personal Digital Assistant), a mobile phone, or a personal computer may be used in another embodiment.

In addition, in the above description, a case where the game apparatus 10 performs all the steps of the information processing is described as an example. However, another apparatus may perform at least a part of the steps of the information processing. For example, in the case where the game apparatus 10 is connected to another apparatus (for example, a server or another game apparatus) in a communicable manner, the game apparatus 10 and the other apparatus may work in coordinated manner to execute the steps of the information processing. In addition, in the above embodiment, the information processing section 31 of the game apparatus 10 executes a predetermined program, whereby the processing shown in the flowcharts described above is performed. However, a dedicated circuit included in the game apparatus 10 may perform a part or all of the steps of the processing.

In addition, the shape of the game apparatus 10 described above, and the shapes, the numbers, the positions, and the like of the various operation buttons 14, the analog stick 15, and the touch panel 13 provided in the game apparatus 10, are merely an example. It is understood that the present invention can be realized even if other shapes, numbers, and positions are employed. In addition, the order of steps, setting values, values for the determinations, and the like used in the above information processing are merely an example. It is understood that the present invention can be realized even if other orders and values are employed.

In addition, instead of supplying the above information processing program to the game apparatus 10 via an external storage medium such as the external memory 45 or the external memory 46 for storing data, the information processing program may be supplied to the game apparatus 10 via a communication line that is wired or wireless. In addition, the information processing program may be stored in advance in a nonvolatile storage apparatus in the game apparatus 10. It is noted that instead of a nonvolatile storage memory, a CD-ROM, a DVD, a similar optical disc storage medium, a flexible disc, a hard disc, an optical magnetic disc, a magnetic tape, or the like may be used as an information storage medium for storing the information processing program. In addition, a volatile memory for temporarily storing the information processing program may be used as an information storage medium for storing the information processing program.

While the invention has been described in detail, the foregoing description is in all aspects illustrative and not restrictive. It will be understood that numerous other modifications and variations can be devised without departing from the scope of the invention.

What is claimed is:

1. A non-transitory computer-readable storage medium having stored therein an information processing program which is executed by a computer of an information processing apparatus, the information processing program including instructions that, when executed by the computer, are configured to:
   - detect a designated position on the display section indicated by a user;
   - when the detected designated position is in a first area of the display section, display an indicator on the display section at a first timing, the indicator indicating a position, in the entirety of the content, of the part of the content displayed on the display section; and
   - when the detected designated position is designated to a second area of the display section different from the first area display the indicator on the display section at a second timing that is different from the first timing.

2. The medium of claim 1, wherein the instructions are further configured to:
   - when the first area is designated by the detected designated position:
     - execute scrolling processing of scrolling the part displayed on the display section, or processing assigned to the first area; and
     - display the indicator when a predetermined condition has been satisfied; and
   - when the second area is designated by the detected designated position:
     - execute the scrolling processing of scrolling the part displayed on the display section; and
     - immediately display the indicator.

3. The medium of claim 2, wherein:
   - when the first area is designated by the detected designated position:
     - the part displayed on the display section is scrolled while the first area continues to be designated;
     - the processing assigned to the first area is executed, after the first area is designated, when the detected designated position has been released, and
   - the predetermined condition is a change in the detected designed position while the first area continues to be designated or that the first area has continued to be designated for a predetermined time period or more.

4. The medium of claim 1, wherein:
   - the first area is an area in the content in which an image that allows a predetermined function to be executed is placed, and
   - the second area is an area in the content in which the image is not placed.

5. An information processing apparatus for displaying a partial subset of content that is larger than a display area of a display device, the information processing apparatus comprising:
   - a processing system that includes at least one processor, the processing system configured to:

detect a designated position on the display device designated by a user;

determine if the detected designated position is within a first area of the display area or a second area of the display area that is different from the first area;

if the detected designated position is determined to be within the first area, selectively display an indicator in accordance with a first time period, the indicator configured to indicate where the partial subset is within the content that is larger than the display area; and if the detected designated position is determined to be within the second area, selectively display the indicator in accordance with a second time period, wherein the first time period is different from the second time period.

6. An information processing system that is configured to output, to a display section, a part of a content larger than an area displayed on the display section, the information processing system comprising:

a designated position detection unit that is configured to detect a designated position on the display section designated by a user;

a first display control unit configured, when the designated position detection unit has determined that a first area has been designated, to display, on the display section at a first timing, an indicator that indicates a position, in the entirety of the content, of the part of the content displayed on the display section; and a second display control unit configured, when the designated position detection unit has determined that a second area different from the first area has been designated, to display the indicator on the display section at a second timing different from the first timing.

7. An information processing method for displaying, on a display section, a part of a content that is larger than an area displayed on the display section, the method comprising:

determining a first designated position on the display section designated by a user;

initiating, via at least one processor, a first display of an indicator in a first timing manner in accordance with the determined first designated position, the displayed indicator configured to indicate a position, in the entirety of the content, that corresponds to content currently displayed on the display section; and determining a second designated position on the display section;

initiating a second display of the indicator in a second timing manner in accordance with the determined second designated position, wherein the first timing manner is different from the second timing manner.

* * * * *